US012779864B2

(12) United States Patent
Katsuki et al.

(10) Patent No.: US 12,779,864 B2
(45) Date of Patent: Nov. 3, 2026

(54) LIQUID CONTAINER AND DISASSEMBLING METHOD OF LIQUID CONTAINER

(71) Applicant: SEIKO EPSON CORPORATION, Tokyo (JP)

(72) Inventors: Kiyoteru Katsuki, Azumino (JP); Suguru Tomii, Shiojiri (JP); Sayaka Shiratori, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 159 days.

(21) Appl. No.: 18/612,009

(22) Filed: Mar. 21, 2024

(65) Prior Publication Data

US 2024/0316942 A1 Sep. 26, 2024

(30) Foreign Application Priority Data

Mar. 22, 2023 (JP) ................................ 2023-045572

(51) Int. Cl.
*B41J 2/175* (2006.01)

(52) U.S. Cl.
CPC ....... *B41J 2/17553* (2013.01); *B41J 2/17513* (2013.01); *B41J 2002/17516* (2013.01)

(58) Field of Classification Search
USPC ........................................................ 347/86
See application file for complete search history.

(56) References Cited

U.S. PATENT DOCUMENTS

| | | | | |
|---|---|---|---|---|
| 9,108,417 | B2 | 8/2015 | Aoki et al. | |
| 2006/0139420 | A1* | 6/2006 | Muranaka | B41J 2/17553 347/86 |
| 2013/0194357 | A1* | 8/2013 | Karasawa | B41J 2/1752 347/86 |
| 2014/0292961 | A1* | 10/2014 | Maeshima | B41J 2/17553 347/86 |

FOREIGN PATENT DOCUMENTS

| | | | | |
|---|---|---|---|---|
| DK | 2039520 | T4 * | 4/2018 | B41J 2/17523 |
| JP | 2012-140011 | A | 7/2012 | |

* cited by examiner

*Primary Examiner* — Manish S Shah
*Assistant Examiner* — Samuel Frederick Boelitz
(74) *Attorney, Agent, or Firm* — Oliff PLC

(57) ABSTRACT

A liquid container has a case that stores a liquid pack. The case includes a case body having a bottomed cylindrical shape with an opening at one end, and a lid member that covers the opening of the case body. The case includes a plurality of fitting claws that is provided in one of the lid member and the case body, and a plurality of fitted portions that is provided in another one of the lid member and the case body and configured to be engaged with the plurality of fitting claws. A plurality of engagement portions in which the plurality of fitting claws and the plurality of fitted portions are engaged, respectively, is located while being hidden inside the case.

3 Claims, 12 Drawing Sheets

LIQUID CONTAINER AND DISASSEMBLING METHOD OF LIQUID CONTAINER

The present application is based on, and claims priority from JP Application Serial Number 2023-045572, filed Mar. 22, 2023, the disclosure of which is hereby incorporated by reference herein in its entirety.

BACKGROUND

1. Technical Field

The present disclosure relates to a liquid container that is used for a liquid discharge apparatus including a discharge head for discharging a liquid and contains a liquid supplied to the discharge head, and a disassembling method of the liquid container.

2. Related Art

For example, JP-A-2012-140011 discloses an ink jet printer (an example of a liquid discharge apparatus) including a transport unit that transports a medium such as paper and a discharge head (an example of a discharge unit) that discharges a liquid such as ink toward the medium.

The liquid discharge apparatus includes an ink cartridge as an example of a liquid container that contains a liquid supplied to a discharge head for discharging a liquid. The liquid discharge apparatus discharges the liquid, supplied from the liquid container (ink cartridge), from the discharge head toward the medium transported by the transport unit so as to print an image or the like on the medium.

The ink cartridge in the related art has a structure in which an engaging portion of a case and a lid cannot be easily disassembled in order to prevent breakage such as coming-off of a component due to falling impact, or disassembling by a user that leads to breakage of an ink pack or ink leakage, for example.

However, in recent years, environmental problems such as global warming and depletion of underground resources have been increasing, and there is a demand for reduction in a plastic usage amount. For this reason, it is necessary to reuse plastic components obtained through disassembling of a liquid container such as a used ink cartridge. Therefore, how to disassemble a liquid container without damaging components that are to be reused becomes a problem. Therefore, there is a demand for easily disassembling a liquid container while damage to components is suppressed as much as possible.

SUMMARY

A liquid container that solves the above-described problems is a liquid container including a case, storing a liquid pack for containing a liquid, that includes a case body having a bottomed cylindrical shape with an opening at one end, and a lid member that covers the opening of the case body, and is formed through fitting of the case body and the lid member in a state in which the lid member closes the opening, a plurality of fitting claws that is provided in one of the lid member and the case body, and a plurality of fitted portions that is provided in another one of the lid member and the case body and configured to be engaged with the plurality of fitting claws, in which a plurality of engagement portions in which the plurality of fitting claws and the plurality of fitted portions are engaged, respectively, is located while being hidden inside the case, and the lid member has a plurality of holes at positions corresponding to the plurality of engagement portions, respectively.

A disassembling method of a liquid container that solves the above-described problems is a disassembling method of a liquid container, the liquid container including a case, storing a liquid pack, that is formed through fitting of a case body having a bottomed cylindrical shape with an opening at one end, and a lid member that covers the opening of the case body, in a state in which the case body and the lid member are engaged, a plurality of fitting claws that is provided in one of the lid member and the case body, and a plurality of fitted portions that is provided in another one of the lid member and the case body and configured to be engaged with the plurality of fitting claws, in which a plurality of engagement portions in which the fitting claws and the fitted portions are engaged is located while being hidden inside the case, and the lid member has a plurality of holes at positions corresponding to the plurality of engagement portions, respectively, the disassembling method including inserting jigs into the plurality of holes and pressing and widening facing inner wall surfaces in the case toward an outside by the jigs to release or weaken engagement of the fitting claws and the fitted portions, and in a state in which engagement of the fitting claws and the fitted portions is released or weakened, separating the lid member and the case body.

DESCRIPTION OF EMBODIMENTS

Hereinafter, an embodiment of a liquid discharge apparatus including a liquid container will be described with reference to the drawings. Note that the liquid discharge apparatus of the present embodiment discharges ink toward a medium such as paper to print (record) characters, images, and the like on the medium.

Figure 1:
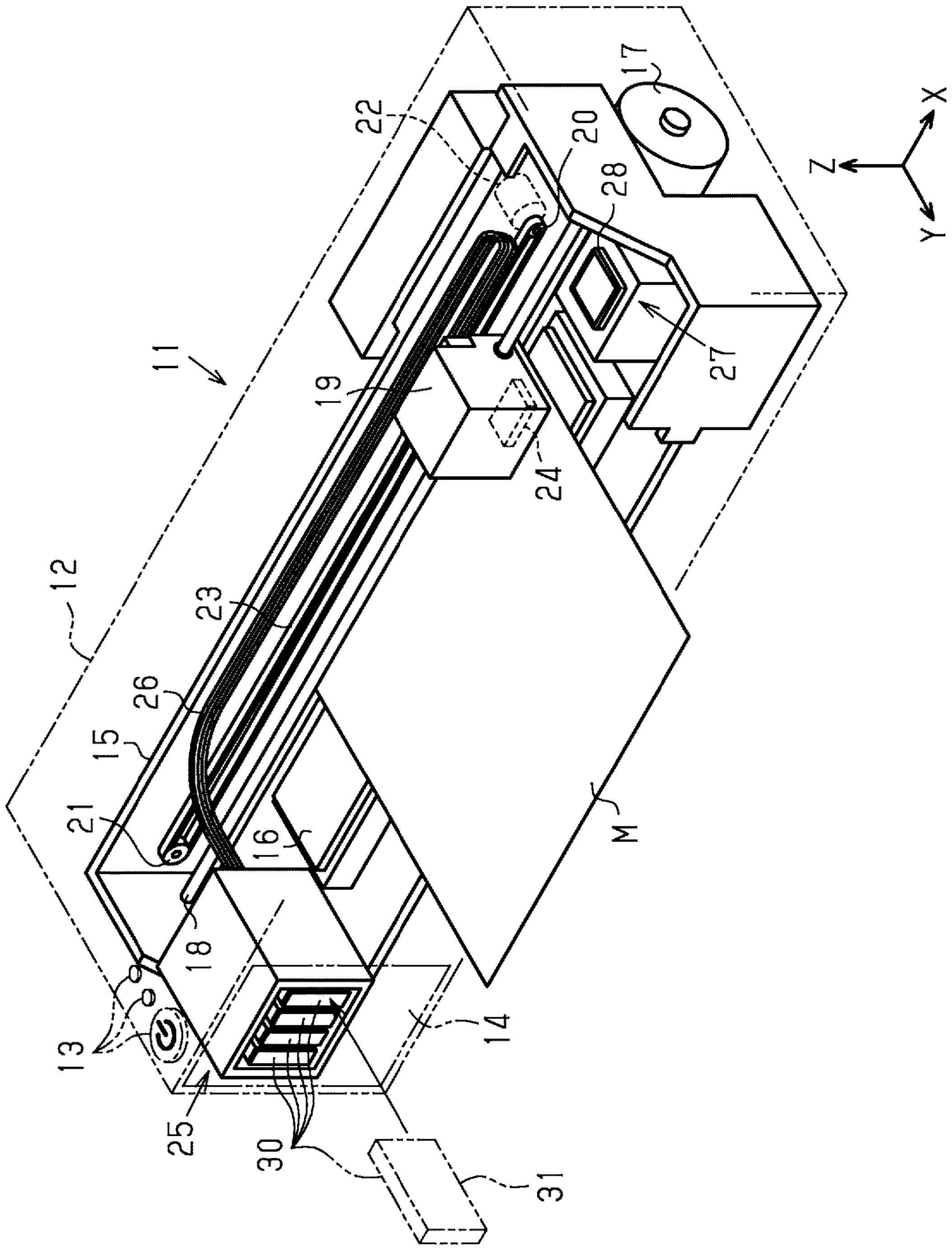
FIG. 1 is a perspective view illustrating a liquid discharge apparatus according to an embodiment.

In the present embodiment, directions are defined by an X-axis, a Y-axis, and a Z-axis, illustrated in FIG. 1, that intersect with (are preferably orthogonal to) each other. While the direction of anti-gravity (Z direction), which is the Z-axis direction, is referred to as an up direction, and the direction of gravity (a −Z direction) is referred to as a down direction. In addition, in FIG. 1, assuming that a liquid discharge apparatus 11 is set on a horizontal plane, a direction extending along the Z-axis is illustrated as an up-down direction Z, and directions extending along a horizontal plane are illustrated as a width direction X and a depth direction Y. That is, the width direction X, the depth direction Y, and the up-down direction Z intersect with (are preferably orthogonal to) each other. In addition, one end side in the depth direction Y may be referred to as a front surface side or a front side, another end side opposite to the one end side may be referred to as a back surface side or a back side, one end side in the width direction X viewed from the front surface side may be referred to as a right side, and another end side may be referred to as a left side.

Configuration of Liquid Discharge Apparatus 11

Hereinafter, an embodiment of a liquid discharge apparatus that includes a liquid container, as a liquid supply source, containing ink as an example of a liquid and discharges a liquid supplied from the liquid container will be described with reference to the drawings.

As illustrated in FIG. 1, the liquid discharge apparatus 11 of the present embodiment is an ink jet printer that discharges ink as an example of a liquid supplied from a liquid container 30. The liquid container 30 is, for example, an ink cartridge. The ink cartridge is detachably attached to the liquid discharge apparatus 11 and supplies ink to a discharge head 24 that discharges a liquid. When the ink in the ink cartridge is depleted, the user removes the ink cartridge from the liquid discharge apparatus 11 and attaches a new ink cartridge. That is, the ink cartridge is replaced. In the liquid container 30 exemplified by such an ink cartridge, when a liquid in the liquid container 30 is depleted, the user removes the liquid container 30 from the liquid discharge apparatus 11 and attaches a new liquid container 30. That is, the liquid container 30 is replaced. The used liquid container 30 that has been replaced is disposed of.

Here, disposal includes collection by a shop, a manufacturer, or an agent that sells the liquid discharge apparatus 11 or the liquid container 30, or a collection agent, or the like. The collected liquid container 30 is recycled. Here, recycling includes material reusing in which resin materials constituting components of the liquid container 30 are remelted and used as materials, and component reusing in which components of the liquid container 30 are used as they are. In material reusing, new resin materials manufactured through melting of resin materials constituting components such as a case of the liquid container 30 are molded to manufacture components such as a new case. In component reusing, components such as a case constituting the liquid container 30 are reused as at least a part of the components constituting a new liquid container 30 so as to manufacture a new liquid container 30. In addition, in the case of component reusing, there are a case in which the entire case of the liquid container 30 is reused, and a case in which some of the components constituting the case are reused.

First, with reference to FIG. 1, a configuration of the liquid discharge apparatus 11 to which the liquid container 30 described above is attached and in which the liquid container 30 is used as a liquid supply source will be described. As illustrated in FIG. 1, the liquid discharge apparatus 11 includes a casing 12 having a substantially rectangular parallelepiped shape, a part of which is indicated by a two-dot chain line. In the casing 12, on a surface on the +Z direction side, which is an opposite direction of the direction of gravity (the −Z direction), that is, on the upper surface, an operation button 13 such as a power button for driving the liquid discharge apparatus 11 is provided. In addition, in the casing 12, on a surface on the +Y direction side, which is a transport direction in which a medium M such as paper is transported, that is, on the front surface, a cover 14 that can be opened and closed is provided. The user can access the inside of the casing 12 in a state in which the cover 14 is opened.

In the casing 12, a frame 15 having a substantially rectangular box shape is stored. In addition, in a lower portion, which is the direction of gravity (the −Z direction) side in the frame 15, a support table 16 whose longitudinal direction is the X direction intersecting with the +Y direction, which is the transport direction of the medium M, is provided and extended in a substantially horizontal direction. In addition, in a lower portion on a rear side, which is a direction (the −Y direction) opposite to the +Y direction that is a front side in the frame 15, a transport motor 17 is provided. That is, by a transport mechanism (not illustrated) driven by the transport motor 17, the medium M is transported on the support table 16 from the rear side thereof toward the front side.

In addition, above the support table 16 in the frame 15, a guide shaft 18 extends in the X direction, which is the longitudinal direction of the support table 16. A carriage 19 is supported by the guide shaft 18 so as to be able to reciprocate in an axis direction of the guide shaft 18.

In addition, near both ends of the guide shaft 18 on a rear wall inner surface of the frame 15, a driving pulley 20 and a driven pulley 21 are each rotatably supported. An output shaft of a carriage motor 22 is coupled to the driving pulley 20. In addition, an endless timing belt 23, a part of which is coupled to the carriage 19, is wound between the driving pulley 20 and the driven pulley 21. In addition, when the carriage motor 22 is driven, while the carriage 19 is guided by the guide shaft 18 via the timing belt 23, the carriage 19 reciprocates in a left-right direction extending in the X direction as a scanning direction.

A discharge head 24 capable of discharging a liquid is provided on a lower side of the carriage 19. In addition, when a liquid is supplied to the discharge head 24, and the supplied liquid is discharged from the discharge head 24, an image or a character is printed on the medium M. The liquid is supplied to the discharge head 24 by the liquid container 30 that is attached so as to be inserted and removed with respect to an attachment portion 25 included in the casing 12. That is, in the casing 12, when viewed from the +Y direction side, which is the transport direction of the medium M, in a left-side region in the left-right direction extending in the X-direction intersecting with the +Y direction, the attachment portion 25 is disposed. In the attachment portion 25, the liquid container 30 is detachably attached. In addition, a flexible liquid supply tube 26, through which a liquid can flow, is drawn between the attachment portion 25 and the carriage 19. In addition, ink is supplied from the liquid container 30, which is attached to the attachment portion 25, to the discharge head 24 via the liquid supply tube 26.

In the present embodiment, for example, four liquid containers 30 each having a liquid pack 40 (see FIG. 3), as an example of a liquid container unit, that contains color ink of each of cyan, magenta, yellow, and black, which are different color phases to each other, in a case 31 having a rectangular parallelepiped shape, can be attached to the attachment portion 25. The respective liquid containers 30, as one of which is illustrated by two-dot chain line in FIG. 1, can be inserted and removed with respect to the attachment portion 25 in the Y direction in a state in which the cover 14 is opened.

In addition, in a region further on a right side (the +X direction side) than is the support table 16 in the frame 15, and also a home position region where the carriage 19 stands by during printing, a maintenance device 27 is disposed. The maintenance device 27 includes a cap 28 whose upper side is open, a suction pump (not illustrated), and the like. In addition, in the liquid discharge apparatus 11, after the carriage 19 is moved to the home position region, maintenance operation for the discharge head 24 is performed by the maintenance device 27 so that the liquid is stably discharged from the discharge head 24.

Configuration of Liquid Container 30

Next, the configuration of the liquid container 30 that contains a liquid will be described. Note that even in a state in which the liquid container 30 is removed from the attachment portion 25, the X, Y, and Z directions when the liquid container 30 is attached to the attachment portion 25 are used to define the longitudinal direction, the width direction, and the height direction of the liquid container 30. That is, the three directions of the liquid container 30 orthogonal to each other are also described as a longitudinal direction Y, a width direction X, and a height direction Z.

Figure 2:
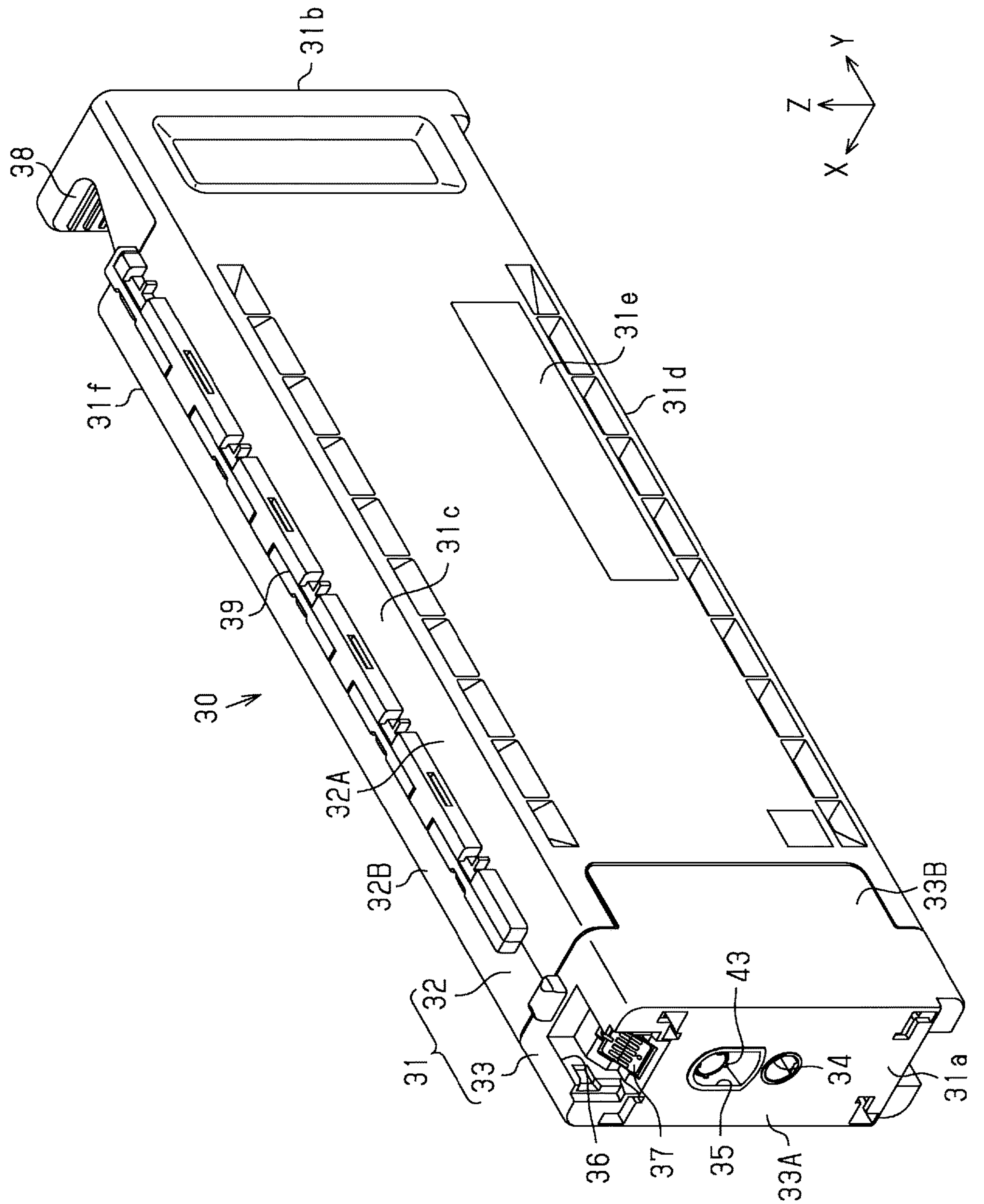
FIG. 2 is a perspective view illustrating a liquid container.

As illustrated in FIG. 2, the liquid container 30 includes a case 31 made of a synthetic resin and having a substantially rectangular parallelepiped shape. In the case 31, a length in the Z direction (the height direction Z) extending in the direction of gravity is longer than a length in the X direction (the width direction X) which becomes an arrangement direction of a plurality of the liquid containers 30 when the plurality of liquid containers 30 is attached to the attachment portion 25 of the liquid discharge apparatus 11. Moreover, the case 31 has a box shape whose length in the Y direction (the longitudinal direction Y) extending in an insertion and removal direction of the liquid container 30 with respect to the attachment portion 25 is longer than a length of the case 31 in the Z direction. The case 31 includes a case body 32 whose inside is hollow and that is open on a rear side, which is a direction (the −Y direction) opposite to the +Y direction, and a lid member 33 that is assembled in the case body 32 so as to close the opening.

As illustrated in FIG. 2, the case 31 includes a first surface 31*a* that is a surface extending in the X direction and the Z direction and also serves as a bottom surface of the lid member 33, a second surface 31*b* facing the first surface 31*a* in the Y direction, and a third surface 31*c*, a fourth surface 31*d*, a fifth surface 31*e*, and a sixth surface 31*f*, which are four surfaces intersecting with the first surface 31*a* and the second surface 31*b*. Incidentally, in a case in which the Y direction side (the +Y direction) which becomes the front side for the user when the liquid container 30 is inserted into the attachment portion 25 from the front surface side (the +Y direction) of the liquid discharge apparatus 11 is the front side, the first surface 31*a* of the case 31 becomes a rear surface located on the −Y direction side, and on the other hand, the second surface 31*b* of the case 31 becomes a front surface located on the +Y direction side. In addition, the third surface 31*c*, which is a surface on the +Z direction side in a state in which the liquid container 30 is attached to the attachment portion 25, becomes an upper surface, and the fourth surface 31*d*, which is a surface in a direction opposite to the +Z direction, that is, in the direction of gravity (the −Z direction side), becomes a lower surface. In addition, of two surfaces facing in the left-right direction extending in the X direction when viewed from the front side, which is on the Y direction side, the fifth surface 31*e* located on the left side (the −X direction side) becomes a left-side surface, and the sixth surface 31*f* located on a right side (the +X direction side) becomes a right-side surface. Note that a direction from the first surface 31*a* toward the second surface 31*b* is defined as the +Y direction, and a direction from the second surface 31*b* toward the first surface 31*a* is defined as the −Y direction. In addition, a direction from the third surface 31*c* toward the fourth surface 31*d* is defined as the −Z direction, and a direction from the fourth surface 31*d* toward the third surface 31*c* is defined as the +Z direction. Moreover, a direction from the fifth surface 31*e* toward the sixth surface 31*f* is defined as the +X direction, and a direction from the sixth surface 31*f* toward the fifth surface 31*e* is defined as the −X direction. In addition, the first surface 31*a* and the second surface 31*b* face each other in the Y direction, the third surface 31*c* and the fourth surface 31*d* face each other in the Z direction, and the fifth surface 31*e* and the sixth surface 31*f* face each other in the X direction.

In addition, on an upper surface (the third surface 31*c*) on the +Z direction side in the case body 32, a rail portion 39 extending in the Y direction, which is the insertion and removal direction with respect to the attachment portion 25, is formed. In addition, on a lower surface (the fourth surface 31*d*), which is a surface on the lower side (the −Z direction side), which is an opposite direction of the +Z direction in the case body 32, in the same manner as the case of the upper surface, a rail portion 39 extending in the Y direction, which is the insertion and removal direction with respect to the attachment portion 25, is also formed. When the liquid container 30 is inserted into or removed from the attachment portion 25 of the liquid discharge apparatus 11, the rail portions 39 described above slide and come into contact with guide rail portions (not illustrated) provided on the attachment portion 25 side to guide insertion and removal of the liquid container 30.

On the first surface 31*a* of the case 31, which is a bottom surface of the lid member 33, a rod insertion hole 34 and a supply pipe insertion hole 35 (opening) are formed. When the liquid container 30 is inserted into the attachment portion 25 and attached, a rod (not illustrated) provided on the attachment portion 25 side is inserted into the rod insertion hole 34, and thus positioning of the liquid container 30 is performed. On the other hand, a liquid supply pipe (not illustrated) made of an ink supply needle or the like provided on the attachment portion 25 side is inserted into the supply pipe insertion hole 35. The liquid supply pipe is coupled to the discharge head 24 via the liquid supply tube 26 (see FIG. 1) that is drawn in the frame 15 of the liquid discharge apparatus 11. Therefore, when the liquid supply pipe is inserted into the supply pipe insertion hole 35, a liquid can be supplied from the liquid container 30 to the discharge head 24. The direction in which the liquid is supplied extends in the Y direction.

In addition, as illustrated in FIG. 2, in the case 31, in a corner portion on the +Z direction side of the lid member 33 that reaches a rearmost portion (the −Y direction) of the attachment portion 25 at the time of insertion into the attachment portion 25, a recessed portion 36 having an inclined surface is formed, and a substrate 37 is attached on the inclined surface in the recessed portion 36. A terminal of the substrate 37 is electrically coupled to a terminal of a substrate (both of which are not illustrated) provided on the attachment portion 25 side when the liquid container 30 is attached to the attachment portion 25, and thus various information such as an ink type, a remaining amount, and the like is exchanged with a control unit (not illustrated) of the liquid discharge apparatus 11. Note that on one side surface (the sixth surface 31*f*, which becomes the right-side surface in FIG. 2) of an end portion of the case 31 on the +Y direction side, which becomes a front side for the user when the case 31 is inserted into or removed from the attachment portion 25, a handle 38 is formed so that the liquid container 30 can be easily gripped.

Figure 3:
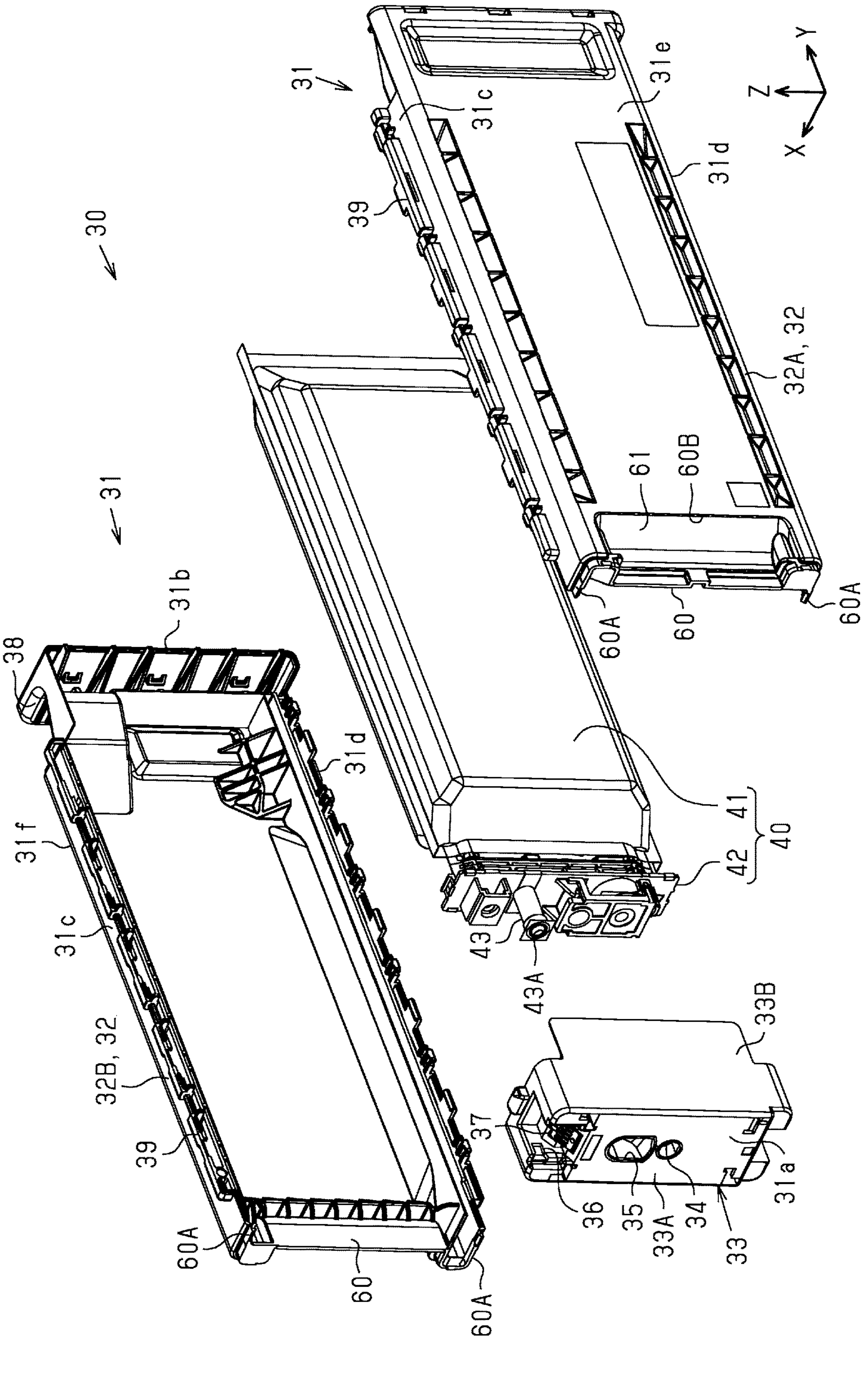
FIG. 3 is an exploded perspective view illustrating the liquid container.
Figure 4:
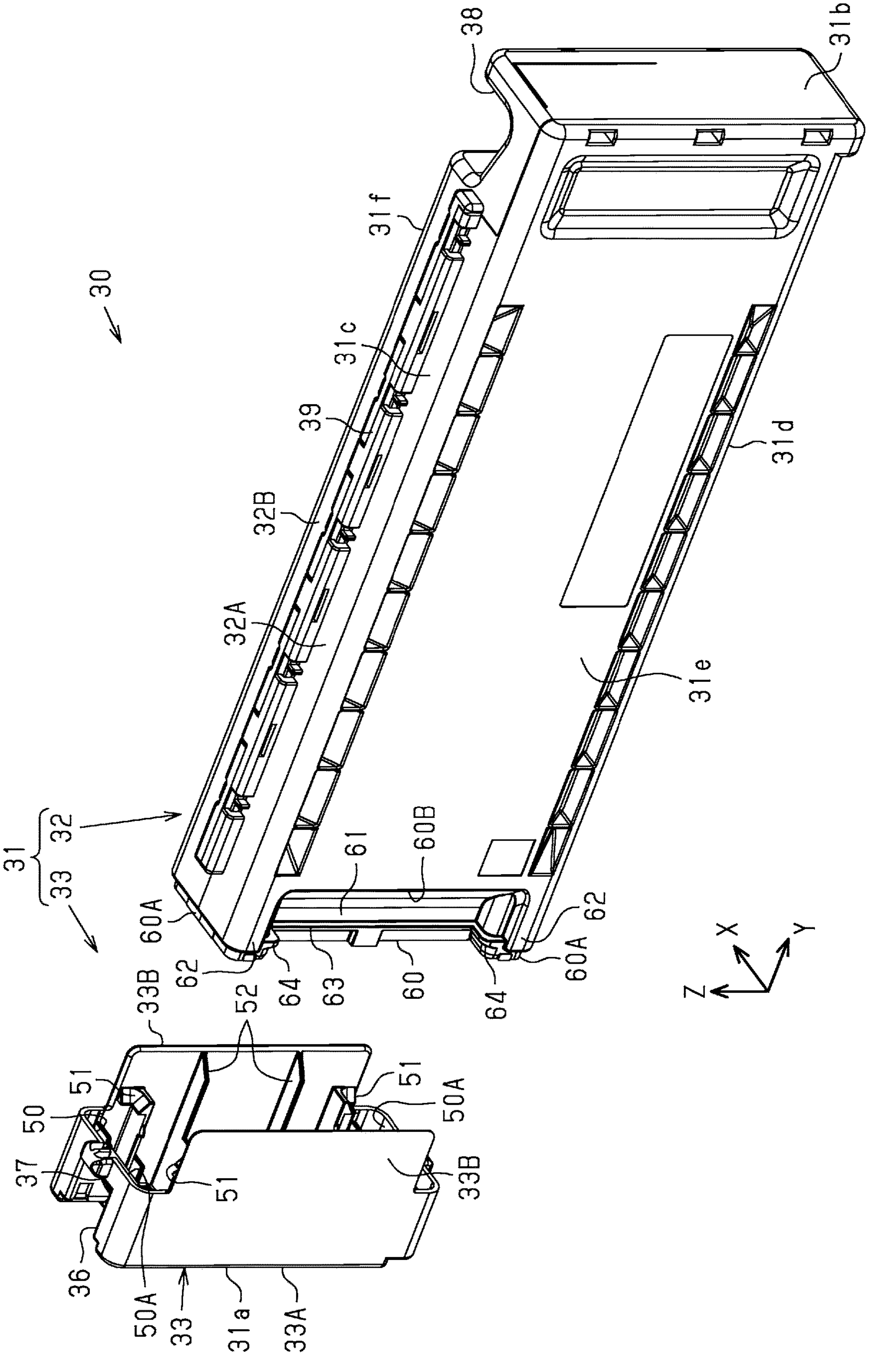
FIG. 4 is a perspective view illustrating a case body and a lid member.

As illustrated in FIGS. 3 and 4, when viewed from a front side, which is the +Y direction side in an attachment state into the attachment portion 25, the case body 32 has a first case member 32A located on a left side (−X direction side) in the X direction, and a second case member 32B located on a right side (+X direction side). The first case member 32A and the second case member 32B are each formed into a substantially box shape with a bottom and have bottom surfaces, which are the respective side surfaces of the first case member 32A and the second case member 32B (the fifth surface 31*e* and the sixth surface 31*f*) each having a substantially rectangular shape extending in the Y direction and the Z direction. In addition, opening edges of the first case member 32A and the second case member 32B are assembled to form the case body 32 having an opening 60 at one end on the −Y direction side.

As illustrated in FIGS. 2 and 4, the case 31 includes the case body 32 having a bottomed cylindrical shape having an opening at one end, and the lid member 33 that covers the opening 60 of the case body 32. The case 31 is formed when the lid member 33 is fitted to one end portion of the case body 32 in a state in which the lid member 33 closes the opening 60. The case body 32 of the present embodiment has a bottomed rectangular cylindrical shape with an opening at one end.

FIG. 3 illustrates an exploded configuration of the liquid container 30. As illustrated in FIG. 3, the case 31 of the liquid container 30 stores the liquid pack 40. The liquid pack 40 contains a liquid such as ink.

As illustrated in FIG. 3, the liquid pack 40 includes a flexible pack body 41 having a bag shape that can contain a liquid such as ink, and a supply member 42 that can supply the liquid in the pack body 41 to the outside. An opening edge portion of the pack body 41 and the supply member 42 are bonded by, for example, thermal welding.

The pack body 41 is a so-called pillow-type ink bag that is formed into a rectangular bag shape made of a flexible resin film or the like. A liquid such as ink is contained in the pack body 41. On the other hand, as illustrated in FIG. 3, most of the supply member 42 is located outside the pack body 41 in a state in which the supply member 42 is bonded to the pack body 41. The supply member 42 has a supply pipe portion 43 projecting in the −Y direction. The liquid that is to be supplied from the supply pipe portion 43 is sent to the supply pipe portion 43 through a channel after passing through a filter (not illustrated) made of a sheet-shaped fiber material, for example, in the pack body 41. In the middle of the channel to the supply pipe portion 43, an ink detection chamber (not illustrated) used for detecting an amount of remaining ink in the pack body 41 is provided.

As illustrated in FIG. 3, the lid member 33 has a lid plate portion 33A having a rectangular plate shape and facing the opening 60 of the case body 32. In addition, as illustrated in FIGS. 2 to 4, the lid member 33 has a pair of extension portions 33B between which an end portion of the case body 32 on the opening 60 side is interposed.

Figure 5:
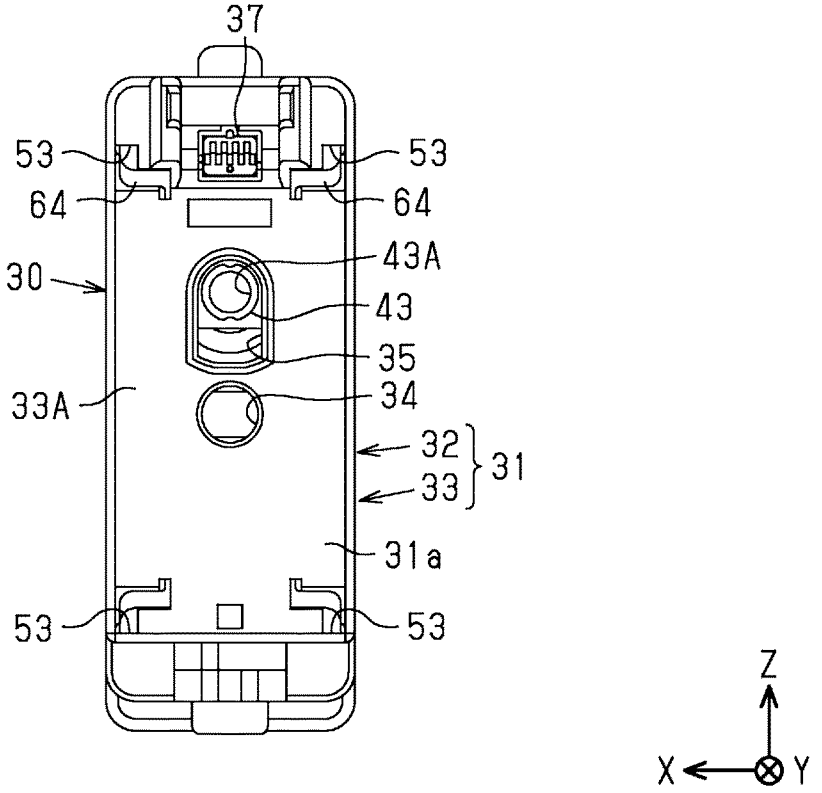
FIG. 5 is a front view illustrating a surface on a supply port side of the liquid container.

The rod insertion hole 34 and the supply pipe insertion hole 35 penetrate the lid plate portion 33A illustrated in FIGS. 3 and 5. A leading end portion of the supply pipe portion 43 of the liquid pack 40 is inserted into the supply pipe insertion hole 35. Therefore, as illustrated in FIGS. 2 and 5, the leading end portion of the supply pipe portion 43 is located in a rear portion of the supply pipe insertion hole 35. In addition, the rod insertion hole 34 illustrated in FIG. 3 is a hole into which a positioning pin (not illustrated) that determines an attachment position of the liquid container 30 is inserted when the liquid container 30 is attached to the attachment portion 25 (see FIG. 1). When the attachment position of the liquid container 30 is determined, a supply port 43A (see FIG. 5) of the supply pipe portion 43 is appropriately coupled to an introduction port of a liquid introduction pipe portion (not illustrated) on the attachment portion 25 side.

Figure 7:
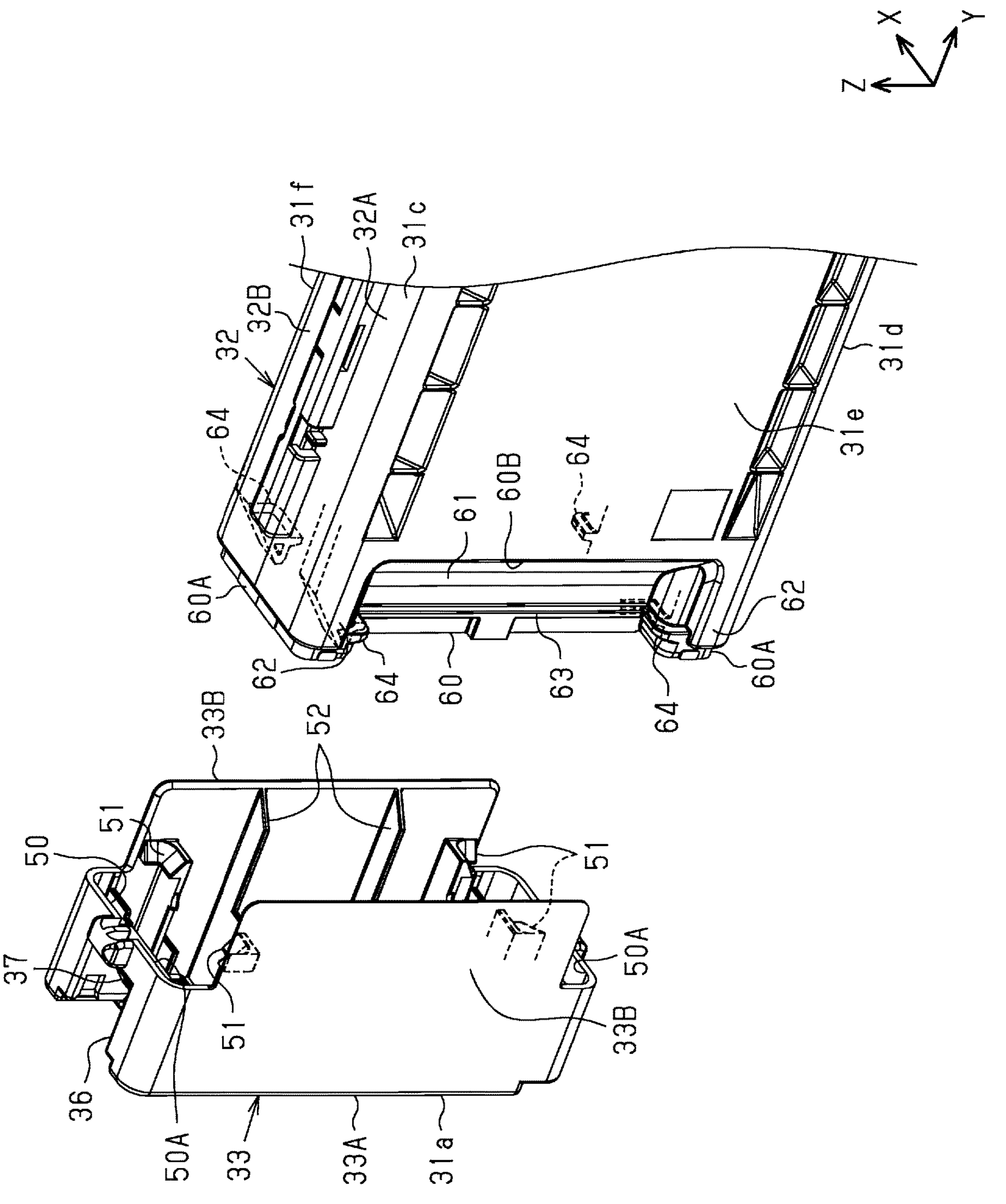
FIG. 7 is a perspective view illustrating the lid member and a part of the case body.

As illustrated in FIGS. 4 and 7, in the end portion of the case body 32 on the opening 60 side, a first guide portion 60A as a portion to be coupled to the lid member 33 is formed. In addition, in the end portion of the case body 32 on the opening 60 side, a recessed portion 61 is formed in a central portion in the Z direction on a side surface. The case body 32 has a second guide portion 60B that is recessed shallowly along a peripheral edge of the recessed portion 61. When the lid member 33 is assembled in the case body 32, the pair of extension portions 33B is fitted to a pair of the second guide portions 60B.

On both sides between which the recessed portion 61 is interposed in the Z direction in the end portion of the case body 32 on the opening 60 side, a pair of expansion portions 62 is formed. The pair of expansion portions 62 expands outward in the X direction with respect to a bottom surface of the recessed portion 61. In addition, on an inner peripheral surface of the recessed portion 61 in the end portion of the case body 32 on the opening 60 side, a rib 63 extending on a path along the opening 60 is formed.

As illustrated in FIGS. 4 and 7, the lid member 33 has an opening 50 in an end portion facing the case body 32. The opening 50 includes a portion formed by a peripheral edge portion of the pair of extension portions 33B and a pair of opening portions 50A located in both end portions between which the pair of extension portions 33B is interposed in the Z direction. When the lid member 33 is assembled in the end portion of the case body 32 on the opening 60 side, the first guide portion 60A is inserted into a corresponding one of the opening portions 50A, whereby the position of the lid member 33 is determined with respect to the case body 32.

In addition, as illustrated in FIG. 7, ribs 52 are formed on inner surfaces of the pair of extension portions 33B in the lid member 33. In a state in which the lid member 33 is assembled in the end portion of the case body 32 on the opening 60 side, the respective ribs 52 come into contact with the bottom surface of the recessed portion 61. As a result, deformation such as bending of a portion of the pair of extension portions 33B can be suppressed in the liquid container 30.

As illustrated in FIGS. 4 and 7, the case 31 includes a plurality of fitting claws 51 provided in one of the lid member 33 and the case body 32, and a plurality of fitted portions 64 provided in another one of the lid member 33 and the case body 32 so as to be engaged with the plurality of fitting claws 51. Either the fitting claws 51 or the fitted portions 64 that are provided in the lid member 33 are provided inside the pair of extension portions 33B.

In the example illustrated in FIGS. 4 and 7, the plurality of fitting claws 51 is provided in the lid member 33. In addition, the plurality of fitting claws 51 is provided inside the pair of extension portions 33B constituting the lid member 33. In the example illustrated in FIGS. 4 and 7, the plurality of fitted portions 64 is provided in the case body 32.

The plurality of fitting claws 51 each has an L-shape when viewed from the −Y direction side. As illustrated in FIG. 7, four fitting claws 51 are provided. In addition, the plurality of fitted portions 64 is composed of a part of the rib 63. Specifically, the fitted portions 64 are formed by portions corresponding to the respective corner portions, of the rib 63, the pair of expansion portions 62 faces. Since the fitted portions 64 are portions corresponding to the corner portions of the rib 63, the fitted portions 64 each have an L-shape when viewed from the −Y direction side. The fitted portions 64 each having an L-shape project in the X direction and the Z direction. As illustrated in FIG. 7, four fitted portions 64 are provided.

Figure 6:
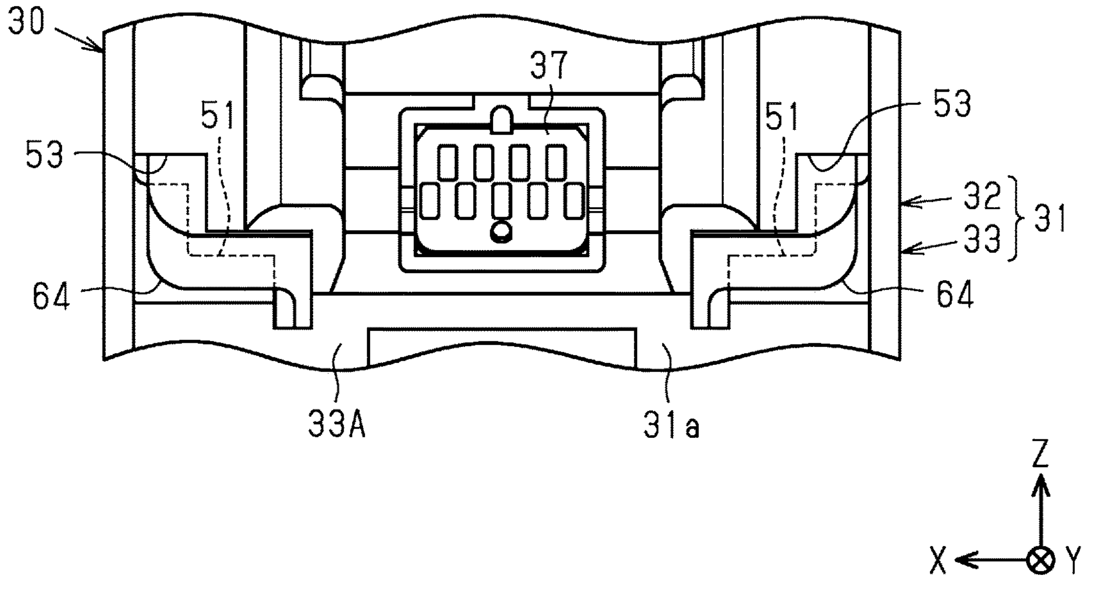
FIG. 6 is a partial front view illustrating a surface on the supply port side of the liquid container.

In the case 31 in which the case body 32 and the lid member 33 are assembled as illustrated in FIG. 2, a plurality of engagement portions in which the plurality of fitting claws 51 and the plurality of fitted portions 64 are engaged, respectively, is located while being hidden inside the case 31 (see FIG. 6). Therefore, even when the user or the like attempts to disassemble the liquid container 30, it is difficult to disassemble the liquid container 30. Note that in order to reuse the resin components constituting the liquid container 30, the liquid container 30 needs to be disassembled.

As illustrated in FIG. 5, the lid member 33 has a plurality of holes 53. The plurality of holes 53 is located corresponding to the plurality of engagement portions in which the plurality of fitting claws 51 and the plurality of fitted portions 64 are engaged, respectively. The lid member 33 has the plurality of holes 53 at positions corresponding to the plurality of fitting claws 51, respectively.

As illustrated in FIG. 5, the plurality of holes 53 includes four holes 53 provided at four corners of the lid plate portion 33A. Specifically, in a front view in which the liquid container 30 is viewed from the −Y direction side as illustrated in FIGS. 5 and 6, the lid plate portion 33A constituting the lid member 33 has a plurality of (for example, four) holes 53 at four corners of the lid plate portion 33A.

As illustrated in FIG. 6, each hole 53 is formed at a position where an engagement portion, in which a corresponding one of the fitting claws 51 and a corresponding one of the fitted portions 64 are engaged, can be exposed in a rear portion in the Y direction in the lid plate portion 33A. The hole 53 in the example illustrated in FIG. 6 is formed into a such size at such a position that an entire engagement part, in which the fitting claw 51 and the fitted portion 64 are engaged, is included in a projection region of the hole 53 in the Y direction. Note that only a part of the engagement part may be included in the projection region in the Y direction of the hole 53. In addition, the hole 53 may be a hole for molding when the lid member 33 is resin-molded using a mold, or a hole provided exclusively for disassembling the liquid container 30.

As illustrated in FIG. 6, in the present embodiment, in a front view in the Y direction, the shape of an overlapping region by the engagement of the fitting claw 51 and the fitted portion 64 is an L-shape (or a reverse L-shape). Therefore, the shape of the hole 53 is formed into an L-shape (or a reverse L-shape) so as to match with the shape of the overlapping region by the engagement of the fitting claw 51 and the fitted portion 64. Operation in which a jig 71 (see FIG. 15) is inserted into the hole 53, and a force is given to the engagement part of the fitting claw 51 and the fitted portion 64 in a direction of releasing the engagement by the operation of the jig 71 can be easily performed. Note that a method of releasing the engagement of the fitting claw 51 and the fitted portion 64 using the jig 71 will be described later.

Detailed Configurations of Fitting Claw 51 and Fitted Portion 64

Next, with reference to FIGS. 8 to 12, detailed configurations of the fitting claws 51 and the fitted portions 64 will be described. As illustrated in FIGS. 8 to 12, each fitting claw 51 has an L-shape when viewed in a first direction (the Y direction), which is a relative movement direction in a process of fitting of the lid member 33 and the case body 32. The respective fitting claws 51 are engaged with the respective fitted portions 64 in two directions that intersect with the first direction and are different from each other. The two directions in which the respective fitting claws 51 and the respective fitted portions 64 are engaged are the X direction and the Z direction.

Figure 8:
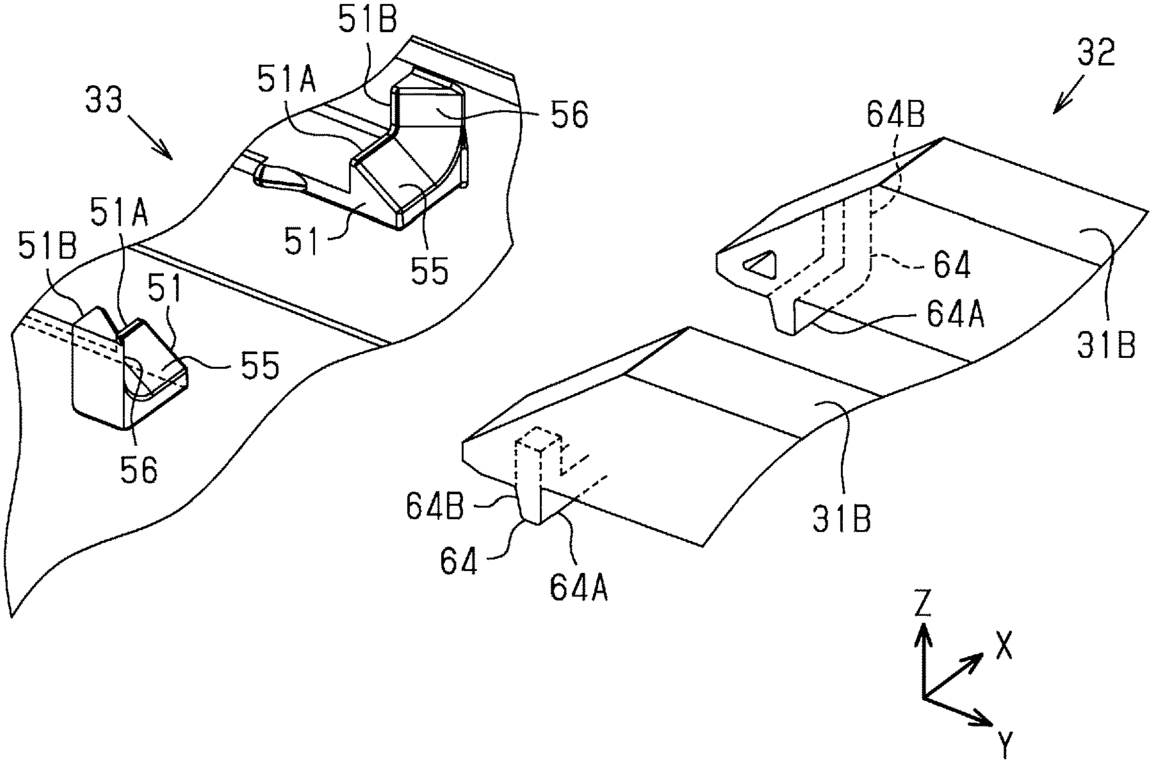
FIG. 8 is a perspective view illustrating a fitting claw and a fitted portion before engagement.

As illustrated in FIG. 8, each fitting claw 51 includes a first claw portion 51A that is engaged in the Z direction and a second claw portion 51B that is engaged in the X direction. On the other hand, each fitted portion 64 is configured to be engaged in two directions, which are the X direction and the Z direction, with respect to the fitting claw 51. Specifically, the fitted portion 64 includes a first rib portion 64A that can be engaged with the first claw portion 51A and a second rib portion 64B that can be engaged with the second claw portion 51B.

As illustrated in FIGS. 8 to 12, the fitting claw 51 has guide surfaces 55 and 56 that guide the fitted portion 64 in a process of fitting of the lid member 33 and the case body 32. The guide surfaces 55 and 56 can guide the fitted portion 64 in directions intersecting with the first direction (the Y direction), which is the relative movement direction at the time of assembling of the lid member 33 and the case body 32. Specifically, the first claw portion 51A has the first guide surface 55 that can guide the first rib portion 64A in the Z direction. In addition, the second claw portion 51B has the second guide surface 56 that can guide the second rib portion 64B in the X direction.

Figure 9:
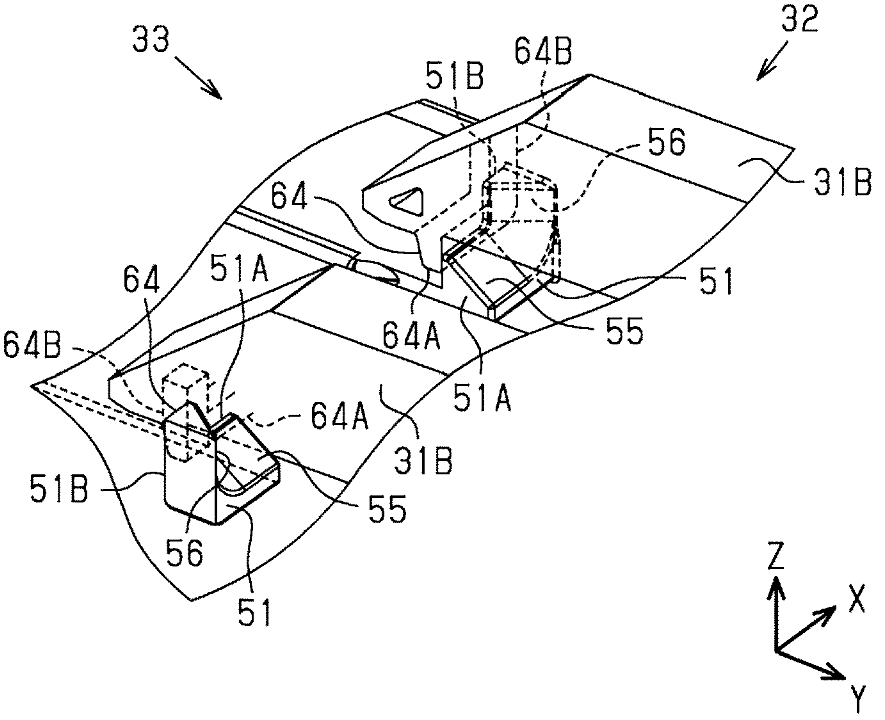
FIG. 9 is a perspective view illustrating the fitting claw and the fitted portion in an engagement state.

As illustrated in FIGS. 8 and 9, the fitted portion 64 is engaged with the fitting claw 51 at a position where the fitted portion 64 is not guided any further after being guided by the guide surfaces 55 and 56. Specifically, the first rib portion 64A is guided by the first guide surface 55 in the Z direction and is engaged with the first claw portion 51A at a position where the first rib portion 64A is not guided any further. In addition, the second rib portion 64B is guided by the second guide surface 56 in the X direction and is engaged with the second claw portion 51B at a position where the second rib portion 64B is not guided any further. In this manner, the fitting claw 51 is engaged with the fitted portion 64 in the two directions of the X direction and the Z direction.

Figure 10:
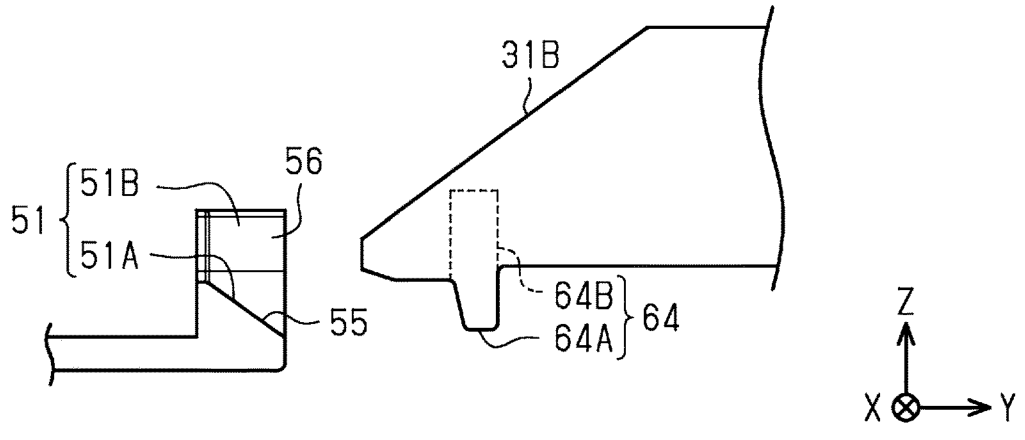
FIG. 10 is a side view illustrating the fitting claw and the fitted portion before engagement.
Figure 11:
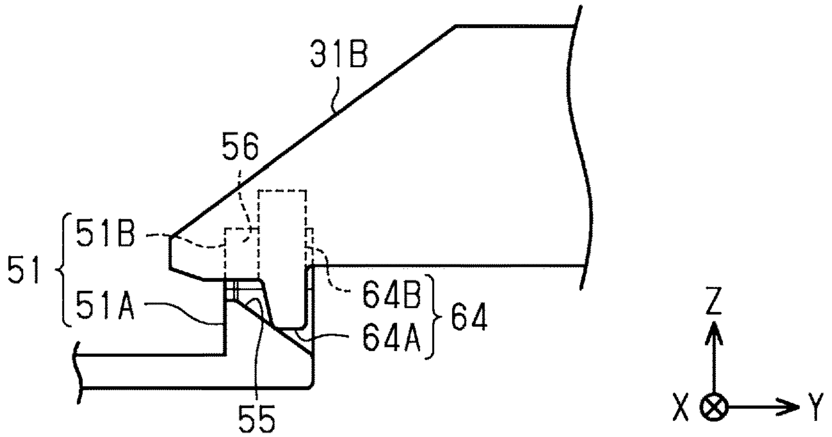
FIG. 11 is a side view illustrating the fitting claw and the fitted portion in a process of engagement.

As illustrated in FIG. 10, the fitting claw 51 and the fitted portion 64 move from positions away from each other in a direction of approaching each other in the first direction (the Y direction), which is the relative movement direction. As illustrated in FIG. 11, the fitted portion 64 is guided by the guide surfaces 55 and 56. By this guide, for example, the fitting claw 51 is displaced so as to escape outward by the fitted portion 64. This is because each of the extension portions 33B, in which the fitting claw 51 is formed, is thinner than a support portion 31B, in which the fitted portion 64 is formed, and is easily bent.

Figure 12:
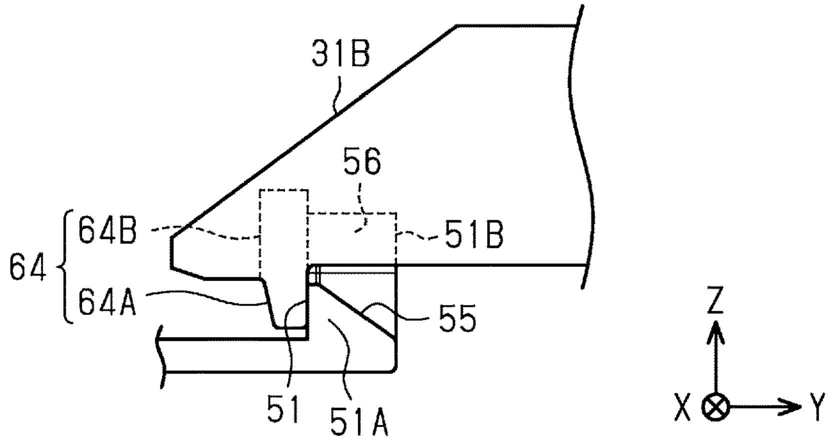
FIG. 12 is a side view illustrating the fitting claw and the fitted portion in an engagement state.

As illustrated in FIG. 12, when the fitted portion 64 reaches a position where the fitted portion 64 is not guided any further than the guide surfaces 55 and 56, the fitting claw 51 that has been bent at a position where the fitting claw 51 has escaped outward is restored, and thus the fitting claw 51 and the fitted portion 64 are engaged.

Figure 13:
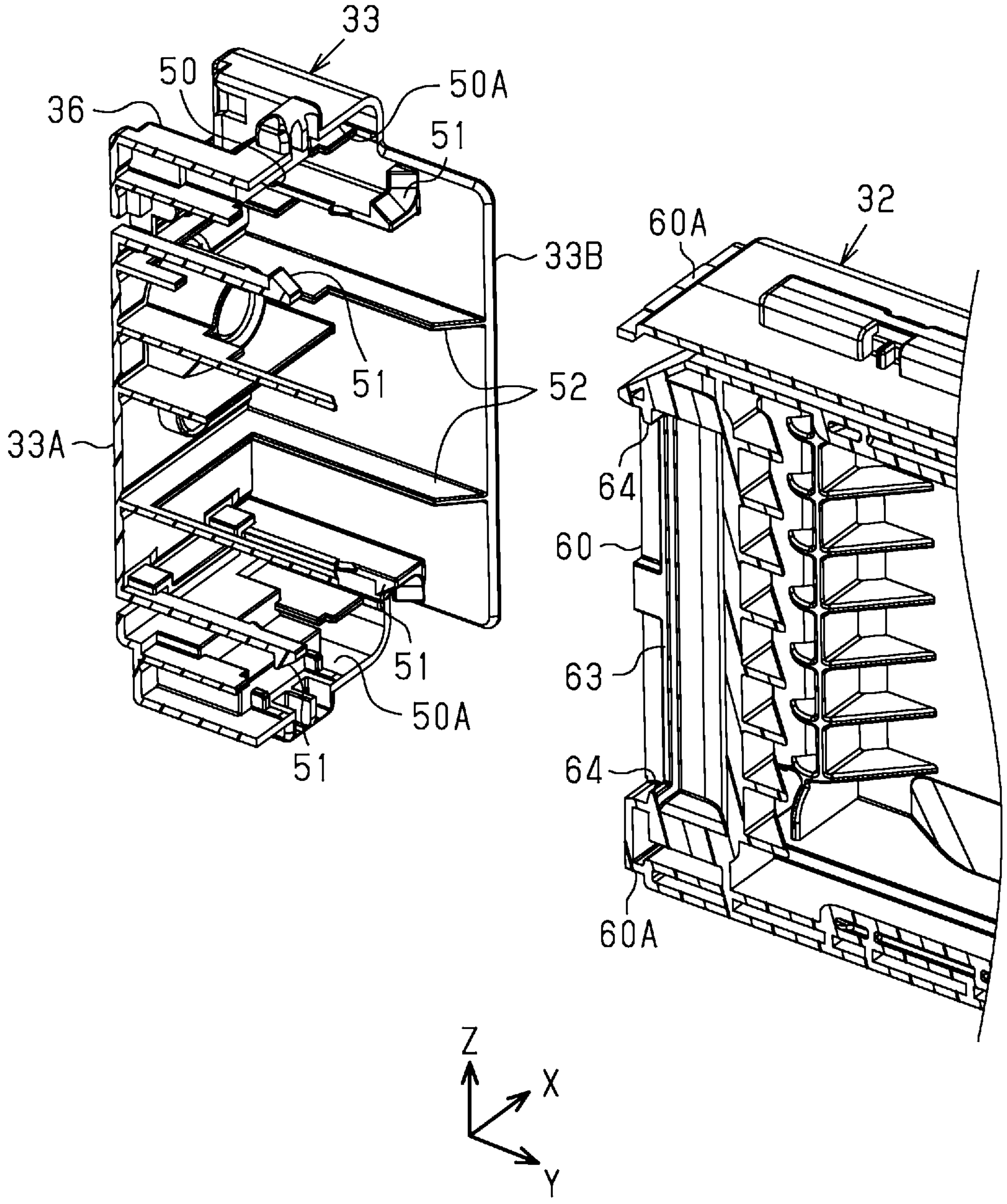
FIG. 13 is a perspective sectional view illustrating the lid member and a part of the case body before engagement.

In addition, as illustrated in FIG. 13, an end portion of the case body 32, in which the fitted portion 64 is formed, is relatively thick and has many reinforcing ribs, and thus is relatively rigid. On the other hand, since the extension portion 33B, in which the fitting claw 51 is formed, is a cantilever planar portion extending further in the Y direction from a portion of the lid plate portion 33A of the lid member 33 to the opening portions 50A, although the extension portion 33B has the ribs 52, the extension portion 33B is easily bent. In addition, each of a pair of the fitting claws 51 is located at each end portion away from the ribs 52 in the Z direction in the extension portion 33B.

Figure 14:
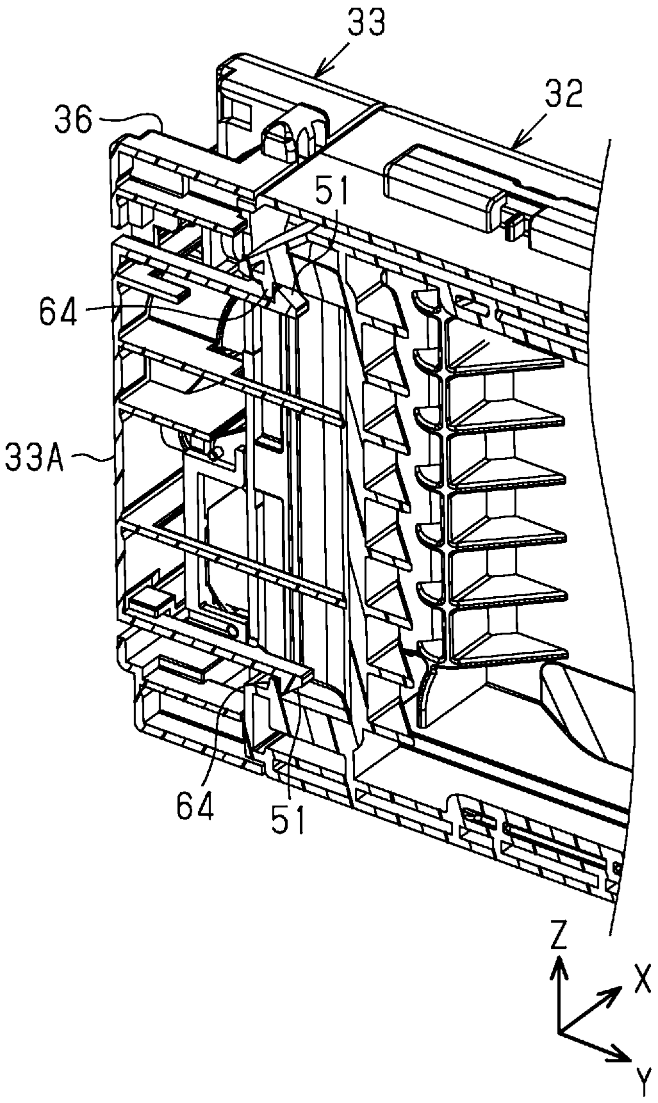
FIG. 14 is a perspective sectional view illustrating the lid member and a part of the case body in an engagement state.

As illustrated in FIG. 14, a plurality of pairs of the fitting claws 51 and the fitted portions 64 is engaged at positions hidden inside the case 31. In order to release the engagement, as illustrated in FIGS. 9 and 12, it is necessary to displace the fitted portions 64 to the outside in the Z direction or to the inside in the X direction, or to displace the fitting claws 51 to the inside in the Z direction or to the outside in the X direction. Here, the fitted portions 64 of the present embodiment are relatively rigid and are less likely to be displaced. On the other hand, as for the fitting claws 51, when the extension portion 33B is bent outward, at least the engagement of the second claw portion 51B and the second rib portion 64B can be released or weakened.

Disassembling Method of Liquid Container 30

Figure 15:
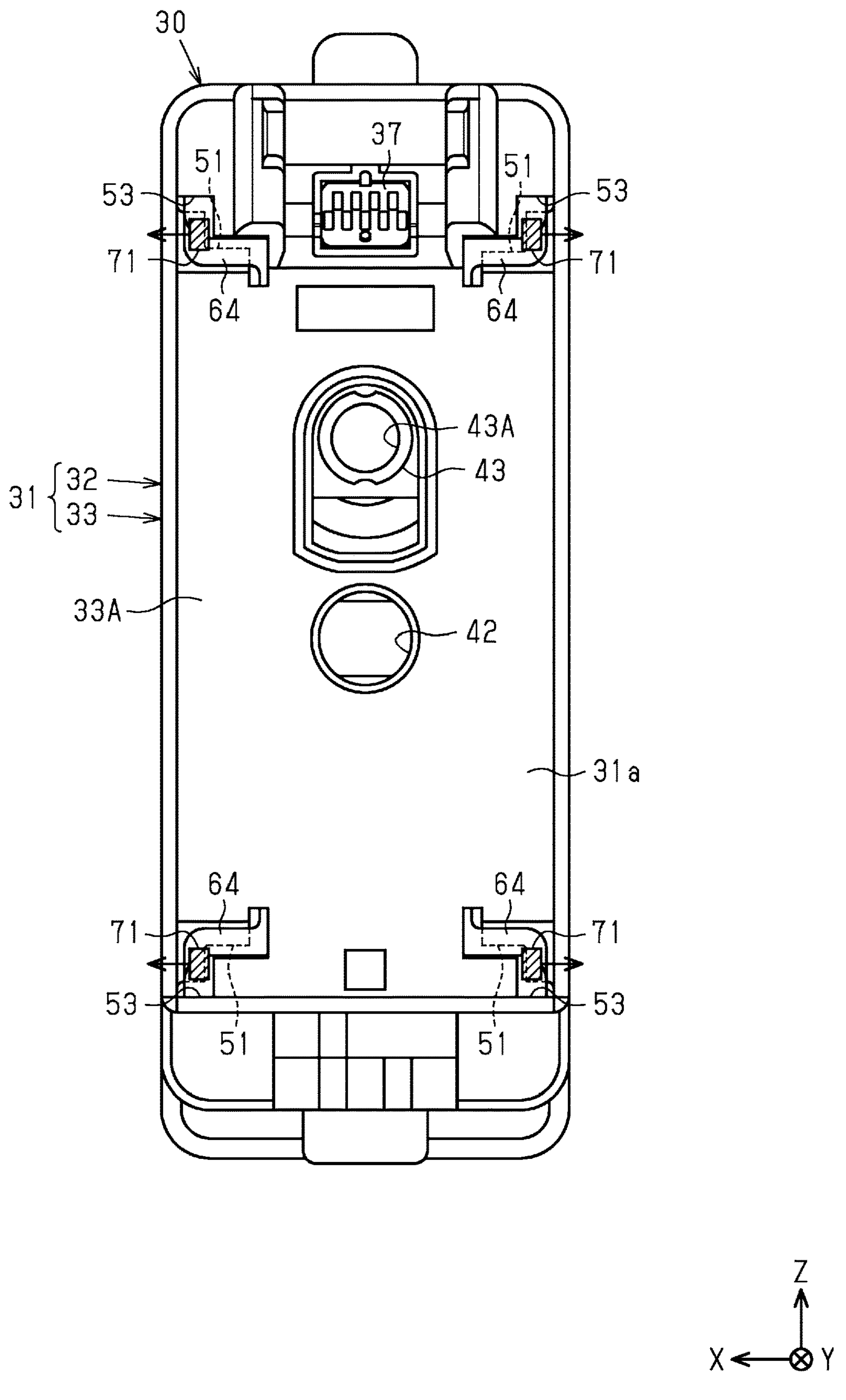
FIG. 15 is a front view explaining disassembling operation of the liquid container using a jig.

Next, with reference to FIGS. 15 to 18, a disassembling method of the liquid container 30 will be described. As illustrated in FIG. 15, in the present embodiment, when the liquid container 30 storing the liquid pack 40 in the case 31 is disassembled, the jig 71 is inserted into the hole 53 to perform operation. The jig 71 of the present embodiment is operated by an operator or operated by an automatic machine such as an automatic disassembly machine. The operator or the automatic disassembly machine inserts the jig 71 into the hole 53 to perform engagement release operation so as to perform disassembling operation of the liquid container 30.

Figure 16:
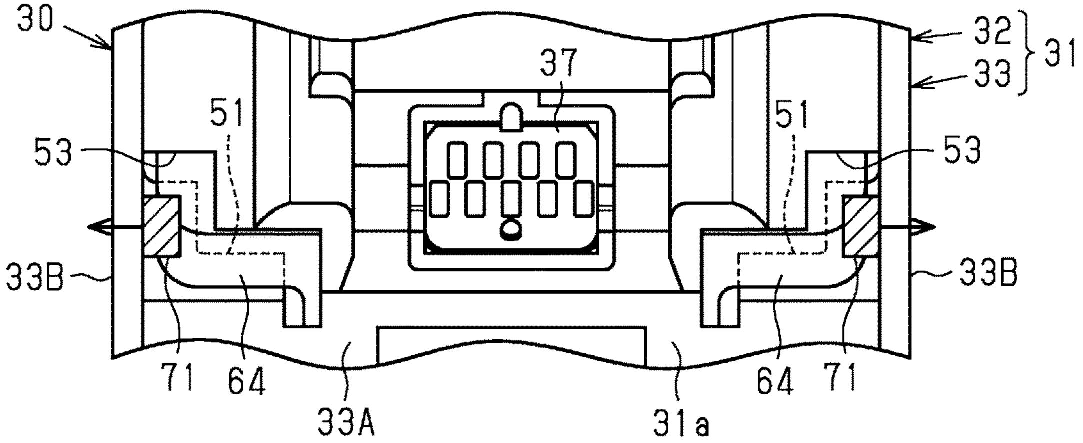
FIG. 16 is a partial front view explaining the disassembling operation of the liquid container using the jig.

As illustrated in FIG. 15, in a state in which four jigs 71 are inserted into four holes 53, the four jigs 71 are simultaneously moved toward the outside in the X direction indicated by the arrows in the figure. FIG. 16 is an enlarged view of a pair of the holes 53 on an upper side in FIG. 15. When the jigs 71 inserted into the holes 53 are moved outward in the X direction, the extension portions 33B, in which the fitting claws 51 are formed, are pressed from the inside toward the outside by the jigs 71.

Figure 17:
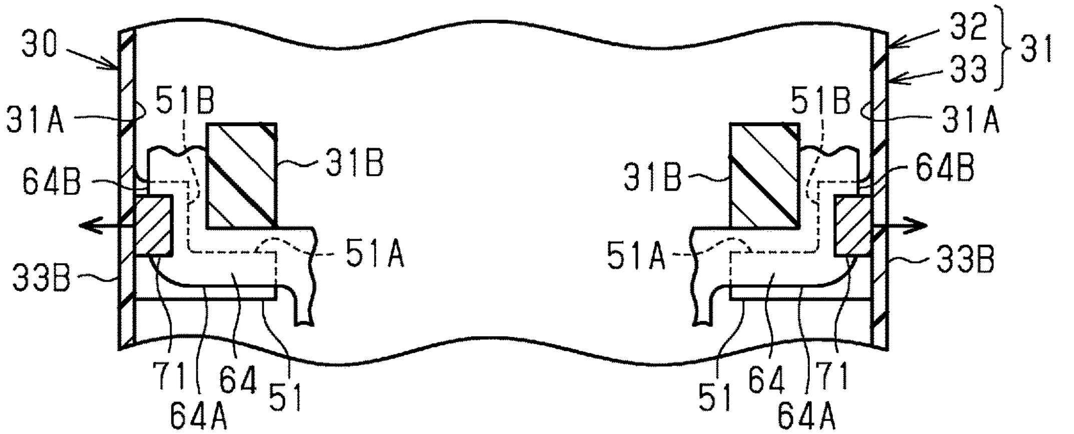
FIG. 17 is a schematic front sectional view explaining the disassembling operation of the liquid container using the jig.

As illustrated in FIG. 17, directions, indicated by the arrows in FIG. 17, of pressing inner wall surfaces 31A of the case 31 toward the outside are directions of releasing the engagement of the fitting claws 51 and the fitted portions 64. In the present embodiment, the fitting claws 51 are provided inside a pair of the extension portions 33B. Therefore, the directions of pressing the inner wall surfaces 31A of the pair of extension portions 33B toward the outside are the directions of releasing the engagement of the fitting claws 51 and the fitted portions 64. That is, a direction of moving the fitting claws 51 away from the fitted portions 64 is the direction of releasing the engagement of the fitting claws 51 and the fitted portions 64. Since the fitting claws 51 and the fitted portions 64 are engaged in the two directions of the X direction and the Z direction, the direction of releasing the engagement of the fitting claws 51 and the fitted portions 64 is also the two directions of the X direction and the Z direction. Even when the engagement is released or weakened only in one of the two directions of the X direction and the Z direction, through moving of the lid member 33 in a removal direction by a light force, the lid member 33 and the case body 32 can be separated.

In the present embodiment, the fitting claws 51 are provided inside the pair of extension portions 33B. Therefore, when the inner wall surfaces 31A of the pair of extension portions 33B are pressed toward the outside, the second claw portions 51B of the fitting claws 51 are displaced toward the outside in the X direction. As a result, engagement areas of the fitting claws 51 and the fitted portions 64 are reduced so that the engagement is easily released.

Effects of Embodiment

Next, effects of the liquid container 30 and the liquid discharge apparatus 11 will be described. In the case 31, a plurality of engagement portions, in which the plurality of fitting claws 51 and the plurality of fitted portions 64 are engaged, respectively, is located while being hidden inside the case 31. In addition, in the plurality of engagement portions, the fitting claws 51 and the fitted portions 64 are engaged in two directions of the X direction and the Z direction.

Therefore, even when the liquid container 30 falls, the lid member 33 is prevented from coming off of the case body 32. In addition, since the engagement portions of the fitting claws 51 and the fitted portions 64 are hidden inside the case 31, a structure in which the user cannot disassemble the liquid container 30 is adopted. For example, staining a hand or a finger with ink, or staining a desk or a floor with ink through disassembling of the liquid container 30 by the user can be avoided.

The liquid container 30 is attached to the attachment portion 25 of the liquid discharge apparatus 11 and used as a liquid supply source during printing. When the liquid is depleted in the liquid container 30, the liquid container 30 is removed from the attachment portion 25. The used liquid container 30 described above is collected by a manufacturer or a recycled product factory (hereinafter referred to as a "manufacturer or the like") through a shop, an agent, a collection agent, or the like.

In the manufacturer or the like, the liquid container 30 that has been collected is disassembled. The disassembling operation is performed by an operator or an automatic disassembly machine. The operator or the automatic disassembly machine performs disassembling operation of the liquid container 30 using the jigs 71.

The jigs 71 each have a thickness and a length that can be inserted into the plurality of holes 53 of the liquid container 30. In the present embodiment, since the number of the holes 53 is four, there are four jigs 71. The four jigs 71 are located at four positions according to the arrangement pattern of the four holes 53 formed at four corners of the lid plate portion 33A of the liquid container 30.

As illustrated in FIG. 15, the operator or the automatic disassembly machine inserts the four jigs 71 into the four holes 53. Then, the four jigs 71 are moved in directions indicated by the arrows in FIG. 15. When an operator performs disassembling operation of the liquid container 30, for example, the operator simultaneously widens the four jigs 71 toward the outside in the X direction indicated by the arrows in FIG. 15 by operation of gripping a jig grip (not illustrated). In addition, when an automatic disassembly machine performs disassembling operation of the liquid container 30, the four jigs 71 are simultaneously widened toward the outside in the X direction indicated by the arrows in FIG. 15.

As illustrated in FIGS. 16 and 17, the four (only two are illustrated in the figures) jigs 71 that are widened in the X direction press the inner wall surfaces 31A of the case 31 toward the outside. In the case of the present embodiment, the four jigs 71 press the inner wall surfaces 31A of the extension portions 33B of the lid member 33 toward the outside.

Figure 18:
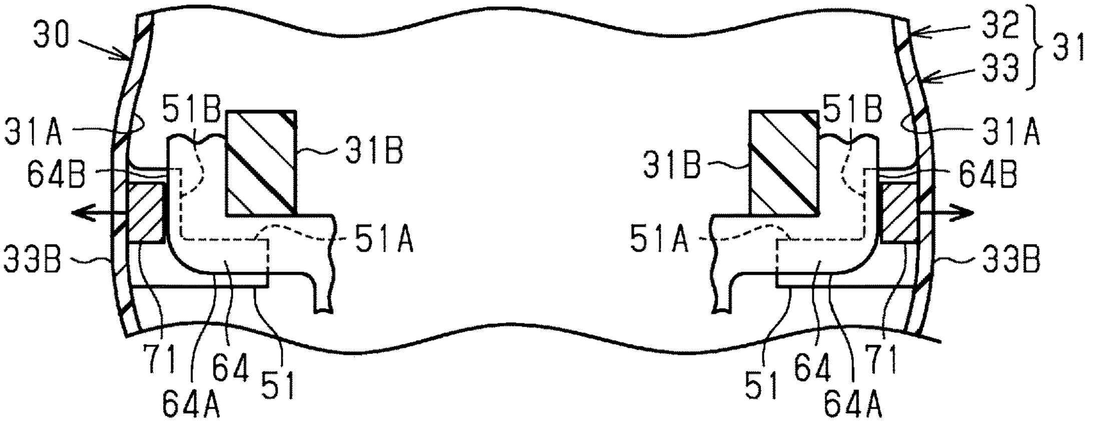
FIG. 18 is a schematic front sectional view explaining the disassembling operation of the liquid container using the jig.

As illustrated in FIG. 18, when the inner wall surfaces 31A of the case 31 are pressed toward the outside by the plurality of jigs 71, pressed portions of the case 31 are bent toward the outside. In the present embodiment, when the inner wall surfaces 31A of the pair of extension portions 33B are pressed toward the outside, the pair of extension portions 33B is bent toward the outside. When the pair of extension portions 33B is bent toward the outside, the fitting claws 51 fixed to inner surface sides of the extension portions 33B are displaced toward the outside in the X direction with respect to the fitted portions 64. By the displacement of the fitting claws 51, the engagement of the fitting claws 51 and the fitted portions 64 is released or weakened.

The operator or the automatic disassembly machine separates the case body 32 and the lid member 33 in a separation direction in a state in which the engagement of four engagement portions of the liquid container 30 is released or weakened. That is, the lid member 33 is moved in the −Y direction, which is the removal direction of the lid member 33, with respect to the case body 32. As a result, the lid member 33 is removed from the case body 32.

When the lid member 33 is removed from the case body 32, in a case in which the engagement of the fitting claws 51 and the fitted portions 64 is released, the case body 32 and the lid member 33 can be separated without being deformed. In this case, both the case body 32 and the lid member 33 are reused as components as they are.

On the other hand, when the lid member 33 is removed from the case body 32 in a state in which the engagement of the fitting claws 51 and the fitted portions 64 is weakened, the fitting claws 51 may be deformed. When the fitting claws 51 of the lid member 33 and other portions are deformed as described above, the lid member 33 cannot be reused as a resin component. In this case, only the case body 32 that is separated, of the case body 32 and the lid member 33, is reused as a resin component, and the lid member 33 is melted and reused as a resin material.

As illustrated in FIG. 15, the present embodiment includes a disassembling method of the liquid container 30, in which the case 31 is disassembled by operation of the jigs 71 inserted into the plurality of holes 53 when the liquid container 30, storing the liquid pack 40 in the case 31, is disassembled.

The disassembling method includes the following two steps of a. and b.

a. Inserting the jigs 71 into the plurality of holes 53 and pressing and widening the inner wall surfaces 31A, facing each other in the case 31, toward the outside by the jigs 71 so as to release or weaken the engagement of the fitting claws 51 and the fitted portions 64.

b. In a state in which the engagement of the fitting claws 51 and the fitted portions 64 is released or weakened, separating the lid member 33 and the case body 32.

In addition, in the disassembling method of the liquid container 30 in the present embodiment, a. described above may be a1. described below.

a1. Pressing and widening the inner wall surfaces 31A, facing each other in the case 31, toward the outside by the jigs 71 inserted into all of the plurality of holes 53 to simultaneously release or weaken all of the plurality of engagement portions of the plurality of fitting claws 51 and the plurality of fitted portions 64.

By a. and b. described above, the liquid container 30 can be relatively easily disassembled. In particular, by a1., through simultaneously releasing or weakening of the engagement of four engagement portions, the liquid container 30 can be more easily disassembled.

As described above, according to the present embodiment, the following effects can be obtained.

1. The present embodiment is the liquid container 30 having the case 31 storing the liquid pack 40 for containing a liquid. The case 31 includes the case body 32 having a bottomed cylindrical shape with the opening 60 at one end, and the lid member 33 that covers the opening 60 of the case body 32. The case 31 is formed through fitting of the case body 32 and the lid member 33 in a state in which the lid member 33 closes the opening 60. The case 31 includes the plurality of fitting claws 51 that is provided in one of the lid member 33 and the case body 32, and the plurality of fitted portions 64 that is provided in another one of the lid member 33 and the case body 32 and configured to be engaged with the plurality of fitting claws 51. The plurality of engagement portions in which the plurality of fitting claws 51 and the plurality of fitted portions 64 are engaged, respectively, is located while being hidden inside the case 31. The lid member 33 has the plurality of holes 53 at positions corresponding to the plurality of engagement portions, respectively. According to this configuration, through inserting of the jigs 71 into the plurality of holes 53 to operate the jigs 71, the engagement of the plurality of fitting claws 51 and the plurality of fitted portions 64 can be released or displaced to a side on which the engagement is released. Therefore, as a result of the engagement release, the case body 32 and the lid member 33 can be disassembled, or by the displacement to the side on which the engagement is released, the case body 32 and the lid member 33 can be disassembled through applying of only a light force. As a result, while damage to components is suppressed as much as possible, the liquid container 30 can be easily disassembled.
2. The direction of pressing the inner wall surfaces 31A of the case 31 toward the outside is the direction of releasing the engagement of the fitting claws 51 and the fitted portions 64. According to this configuration, through pressing of the inner wall surfaces 31A of the case 31 toward the outside by the jigs 71 inserted into the plurality of holes 53, the engagement of the fitting claws 51 and the fitted portions 64 is released. As a result, the liquid container 30 can be disassembled into a state in which the liquid container 30 can be reused.
3. The lid member 33 has the pair of extension portions 33B between which an end portion of the case body 32 on the opening 60 side is interposed. Either the fitting claws 51 or the fitted portions 64 are provided inside the pair of extension portions 33B. The direction of pressing the inner wall surfaces 31A of the pair of extension portions 33B toward the outside is the direction of releasing the engagement of the fitting claws 51 and the fitted portions 64. According to this configuration, through pressing of the pair of extension portions 33B toward the outside by the jigs 71 inserted into the plurality of holes 53, the plurality of fitting claws 51 and the plurality of fitted portions 64 can be displaced in a direction of releasing the engagement. As a result, the case body 32 and the lid member 33 can be easily disassembled.

4. The plurality of fitting claws 51 is provided in the lid member 33, and the plurality of fitted portions 64 is provided in the case body 32. The lid member 33 has the plurality of holes 53 at positions corresponding to the plurality of fitting claws 51, respectively. According to this configuration, through inserting of the jigs 71 into the plurality of holes 53 that opens in the lid member 33 to operate the jigs 71, the plurality of fitting claws 51 and the plurality of fitted portions 64 can be displaced in the engagement release direction. As a result, the case body 32 and the lid member 33 can be easily disassembled.

5. The case body 32 has a bottomed rectangular cylindrical shape with the opening 60 at one end. The lid member 33 has the lid plate portion 33A having a rectangular plate shape and facing the opening 60. The plurality of holes 53 includes four holes 53 provided at four corners of the lid plate portion 33A. According to this configuration, through inserting of the jigs 71 into the four holes 53 that open at the four corners of the lid plate portion 33A, of the lid member 33, facing the opening 60 of the case body 32 to operate the jigs 71, the plurality of fitting claws 51 and the plurality of fitted portions 64 can be displaced in the engagement release direction. As a result, the case body 32 and the lid member 33 can be easily disassembled.

6. The respective fitting claws 51 have the guide surfaces 55 and 56 that guide the respective fitted portions 64 in a direction intersecting with a first direction, which is a relative movement direction in a process of fitting of the lid member 33 and the case body 32. The respective fitted portions 64 are engaged with the respective fitting claws 51 at a position where the respective fitted portions 64 are not guided any further after being guided by the guide surfaces 55 and 56. According to this configuration, the respective fitted portions 64 are engaged with the respective fitting claws 51 at a position where the respective fitted portions 64 are not guided any further after being guided by the guide surfaces 55 and 56. As a result, the liquid container 30 can be easily manufactured into a state in which it is difficult to disassemble the case 31. In addition, even such a case 31 can be relatively easily disassembled into the case body 32 and the lid member 33 through inserting of the jigs 71 into the holes 53.

7. The respective fitting claws 51 have an L-shape when viewed in the first direction, which is the relative movement direction in a process of fitting of the lid member 33 and the case body 32. The fitting claws 51 and the fitted portions 64 are engaged in two different directions that intersect with the first direction. According to this configuration, since the fitting claws 51 and the fitted portions 64 are engaged in two different directions that intersect with the first direction, the liquid container 30 can be manufactured into a state in which it is difficult to disassemble the case 31. In addition, even such a case 31 can be relatively easily disassembled into the case body 32 and the lid member 33 through inserting of the jigs 71 into the holes 53.

8. The present embodiment is a disassembling method of the liquid container 30, in which the case 31 is disassembled in the liquid container 30, including the case 31, storing the liquid pack 40, that is formed through fitting of the case body 32 and the lid member 33 that covers the opening 60 of the case body 32 in a state in which the case body 32 and the lid member 33 are engaged. In the liquid container 30, the plurality of engagement portions in which the fitting claws 51 and the fitted portions 64 are engaged is located while being hidden inside the case 31. The lid member 33 has the plurality of holes 53 at positions corresponding to the plurality of engagement portions, respectively. The disassembling method of the liquid container 30 includes a. inserting the jigs 71 into the plurality of holes 53 and pressing and widening the facing inner wall surfaces 31A in the case 31 toward the outside by the jigs 71 to release or weaken the engagement of the fitting claws 51 and the fitted portions 64. In addition, the disassembling method includes b. in a state in which the engagement of the fitting claws 51 and the fitted portions 64 is released or weakened, separating the lid member 33 and the case body 32. According to this method, through pressing and widening of the facing inner wall surfaces 31A in the case 31 toward the outside by the jigs 71 inserted into the plurality of holes 53, the engagement of the fitting claws 51 and the fitted portions 64 can be released or weakened. As a result, the case 31 can be easily disassembled into the case body 32 and the lid member 33.

9. In a. described above, a1. described below is performed. The disassembling method of the liquid container 30 includes a1. pressing and widening the facing inner wall surfaces 31A in the case 31 toward the outside by the jigs 71 inserted into all of the plurality of holes 53 to simultaneously release or weaken engagement of all of the plurality of engagement portions of the plurality of fitting claws 51 and the plurality of fitted portions 64. According to this method, through pressing and widening of the facing inner wall surfaces 31A in the case 31 toward the outside by the jigs 71 inserted into all of the plurality of holes 53, all of the plurality of engagement portions of the plurality of fitting claws 51 and the plurality of fitted portions 64 can be simultaneously released or weakened. As a result, the case 31 can be easily disassembled into the case body 32 and the lid member 33.

Note that the above embodiment can be changed into an aspect exemplified by the modifications described below. Moreover, the above-described embodiment can be appropriately combined with the modifications described below to make another modification, and the modifications described below can be appropriately combined to make another modification.

The configuration is not limited to simultaneously pressing the facing inner wall surfaces 31A in the case 31 toward to the outside by the jigs 71 inserted into all of the plurality of holes 53. The timing of pressing the inner wall surfaces in the case 31 toward the outside by the jigs 71 inserted into the plurality of holes 53 may be deviated. For example, operation, in which the jigs 71 inserted into an upper left-and-right pair of the holes 53 are pressed toward the left and right outer sides, is performed at the same timing, operation, in which the jigs 71 inserted into a lower left-and-right pair of the holes 53 are pressed toward the left and right outer sides, is performed at the same timing, and the pressing timing may be different between the upper pair and the lower pair. In this manner, the timing of releasing or weakening the plurality of engagement portions may be different between the upper side and the lower side.

In the embodiment, four fitting claws and four fitted portions are provided at four corners, but the number does not have to be four. For example, three fitting claws and three fitted portions may be provided at three portions of the lid plate portion, or two fitting claws and two fitted portions may be provided at two portions of the lid plate portion. In this case, three holes 53 in the former case may be provided in portions corresponding to the engagement portions, respectively, and two holes 53 in the latter case may be provided in portions corresponding to the engagement portions, respectively.

In the embodiment, the fitting claws 51 may be provided in the case body 32, and the fitted portions 64 may be provided in the lid member 33. That is, the plurality of fitting claws 51 may be provided in one of the lid member 33 and the case body 32, and the plurality of fitted portions 64 may be provided in another one so as to be able to be engaged with the plurality of fitting claws 51. In addition, the fitting claws 51 and the fitted portions 64 may be provided in the case body 32, and the fitted portions 64 that can be engaged with the fitting claws 51 on the case body 32 side and the fitting claws 51 that can be engaged with the fitted portion 64 on the case body 32 side may be provided in the lid member 33.

The direction of pressing the inner wall surfaces 31A of the case 31 toward the outside need only be a direction of releasing the engagement of the fitting claws 51 and the fitted portions 64. The direction of pressing the inner wall surfaces 31A of the case 31 toward the outside may be a direction parallel to the Z direction. In addition, in the direction of pressing the inner wall surfaces 31A of the case 31 toward the outside, two directions of a direction of pressing toward the outside in the X direction and a direction of pressing toward the outside in the Z direction may exist in a mixed manner.

Portions where the inner wall surfaces 31A of the case 31 are pressed by the plurality of jigs 71 are not limited to the inner wall surfaces 31A of the extension portions 33B of the lid member 33. Portions other than the extension portions 33B of the lid member 33 may be pressed by the jigs 71. In addition, the plurality of jigs 71 may press the inner wall surfaces 31A of the case body 32.

Portions other than the inner wall surfaces 31A of the case 31 may be pressed. For example, the fitted portions 64 and the fitting claws 51 may be directly pressed by the jigs 71 inserted into the holes 53. In addition, the direction of pressing the jigs 71 inserted into the holes 53 may be an inner side in the X direction or an inner side in the Z direction of the case 31 as long as the direction is a direction of releasing the engagement of the fitting claws 51 and the fitted portions 64.

The holes 53 may be provided in portions other than the lid plate portion 33A of the lid member 33. For example, the holes 53 may be formed in a side portion of the lid member 33 or the extension portions 33B. In addition, the holes 53 may be formed in the lid plate portion 33A, and a side portion of the lid member 33 or the extension portions 33B, in the lid member 33, in a mixed manner. In addition, the holes 53 may also be formed in the case body 32, in addition to the lid member 33, as long as the engagement of the fitting claws 51 and the fitted portions 64 can be released.

The shape of the case 31 is not limited to the shape of the embodiment, and may be appropriately changed. The shape may be a cylindrical shape or an elliptic cylindrical shape.

The direction in which the liquid container 30 is attached to the attachment portion 25 so as to be inserted and removed may be a different direction from the direction (the Y direction) of the embodiment. For example, the direction may be a direction in which the liquid container 30 can be inserted and removed from a lateral side of the liquid discharge apparatus 11 in the X direction, or may be a direction in which the liquid container 30 can be inserted and removed from an upper side of the liquid discharge apparatus 11 in the Z direction.

The medium M is not limited to paper, and may be a film made of a synthetic resin, or cloth such as a fabric or a non-woven fabric. Moreover, the medium M may be a laminated medium including a synthetic resin layer and a metal layer, a foil made of metal, or the like.

The liquid discharge apparatus 11 is not limited to an ink jet printer that performs printing on paper, and may be a textile printing apparatus.

The liquid discharge apparatus 11 may be a liquid discharge apparatus that discharges a liquid other than ink. The status of the liquid discharged as very small droplets from the liquid discharge apparatus includes a granular shape, a tear-drop shape, and a shape having a thread-like trailing end. The liquid referred to here may be any kind of material that can be discharged from the liquid discharge apparatus. For example, the liquid need only be a material whose substance is in the liquid phase, and includes a liquid state having high or low viscosity, sol, gel water, other fluid states such as inorganic solvents, organic solvents, solutions, liquid resins, and liquid metals (metal solutions). The liquid is not limited to being a one-state substance, and also includes particles of a functional material made from solid matter, such as pigment or metal particles, that are dissolved, dispersed, or mixed in a solvent. Representative examples of the liquid include ink such as the ink described in the above embodiment, as well as liquid crystal, and the like. Here, "ink" encompasses general water-based ink and oil-based ink, as well as various types of liquid compositions such as gel ink and hot melt-ink. Specific examples of the liquid discharge apparatus include an apparatus that discharges a liquid containing, in the form of dispersion or dissolution, a material such as an electrode material or a color material used in manufacturing or the like of a liquid crystal display, an electro-luminescence (EL) display, a surface-emitting display, or a color filter, for example. The liquid discharge apparatus may also be an apparatus that discharges biological organic matter used in manufacturing of a biochip, an apparatus that is used as a precision pipette and discharges a liquid serving as a sample, a textile printing apparatus, a micro-dispenser, or the like. The liquid discharge apparatus may also be an apparatus that discharges lubricating oil in a pinpoint manner to a precision machine such as a watch or a camera, or an apparatus that discharges a transparent resin liquid such as ultraviolet-cured resin onto a substrate in order to form a micro-hemispherical lens (optical lens) or the like that is used in an optical communication element or the like. The liquid discharge apparatus may also be an apparatus that discharges an etchant which is acid, alkaline, or the like, in order to etch a substrate or the like. In addition, the liquid container may be a liquid container that is detachably attached to the liquid discharge apparatus 11 that can discharge a liquid other than ink as described above and is used, and have a case storing a liquid pack.

Hereinafter, technical ideas obtained from the embodiment and modifications will be described together with the effects. A. The liquid container is a liquid container including a case, storing a liquid pack for containing a liquid, that includes a case body having a bottomed cylindrical shape with an opening at one end, and a lid member that covers the opening of the case body, and is formed through fitting of the case body and the lid member in a state in which the lid member closes the opening, a plurality of fitting claws that is provided in one of the lid member and the case body, and a plurality of fitted portions that is provided in another one of the lid member and the case body and configured to be engaged with the plurality of fitting claws, in which a plurality of engagement portions in which the plurality of fitting claws and the plurality of fitted portions are engaged, respectively, is located while being hidden inside the case, and the lid member has a plurality of holes at positions corresponding to the plurality of engagement portions, respectively.

According to this configuration, through inserting of the jigs into the plurality of holes to operate the jigs, the engagement of the plurality of fitting claws and the plurality of fitted portions can be released or displaced to a side on which the engagement is released. Therefore, as a result of the engagement release, the case body and the lid member can be disassembled, or by the displacement to a side on which the engagement is released, the case body and the lid member can be easily disassembled through applying of only a light force. As a result, while damage to components is suppressed as much as possible, the liquid container can be easily disassembled.

B. In the liquid container described in A. described above, a direction of pressing an inner wall surface of the case toward an outside may be a direction of releasing engagement of the fitting claws and the fitted portions. According to this configuration, when the inner wall surface of the case is pressed toward the outside by the jigs inserted into the plurality of holes, the engagement of the fitting claws and the fitted portions is released. Therefore, the liquid container can be disassembled into a state in which the liquid container can be reused.

C. In the liquid container described in B. described above, the lid member may have a pair of extension portions between which an end portion of the case body on a side of the opening is interposed, either the fitting claws or the fitted portions may be provided inside the pair of extension portions, and a direction of pressing an inner wall surface of the pair of extension portions toward an outside may be a direction of releasing engagement of the fitting claws and the fitted portions.

According to this configuration, through pressing of the pair of extension portions toward the outside by the jigs inserted into the plurality of holes, the plurality of fitting claws and the plurality of fitted portions can be displaced in a direction of releasing the engagement. Therefore, the case body and the lid member can be easily disassembled.

D. In the liquid container described in any one of A. to C. described above, the plurality of fitting claws may be provided in the lid member, the plurality of fitted portions may be provided in the case body, and the lid member may have the plurality of holes at positions corresponding to the plurality of fitting claws, respectively. According to this configuration, through inserting of the jigs into the plurality of holes that opens in the lid member to operate the jigs, the plurality of fitting claws and the plurality of fitted portions can be displaced in the engagement release direction. As a result, the case body and the lid member can be easily disassembled.

E. In the liquid container described in any one of A. to D. described above, the case body may have a bottomed rectangular cylindrical shape with an opening at one end, the lid member may have a lid plate portion having a rectangular plate shape and facing the opening, and the plurality of holes may include four holes provided at four corners of the lid plate portion.

According to this configuration, through inserting of the jigs into the four holes that open at the four corners of the lid plate portion, of the lid member, facing the opening of the case body to operate the jigs, the plurality of fitting claws and the plurality of fitted portions can be displaced in the engagement release direction. As a result, the case body and the lid member can be easily disassembled.

F. In the liquid container described in any one of A. to D. described above, the respective fitting claws may have a guide surface that guides the respective fitted portions in a direction intersecting with a first direction, which is a relative movement direction in a process of fitting of the lid member and the case body, and the respective fitted portions may be engaged with the respective fitting claws at a position where the respective fitted portions are not guided any further after being guided by the guide surface.

According to this configuration, the respective fitted portions are engaged with the respective fitting claws at a position where the respective fitted portions are not guided any further after being guided by the guide surface. Therefore, the liquid container can be easily manufactured into a state in which it is difficult to disassemble the case. In addition, even such a case can be relatively easily disassembled into the case body and the lid member through inserting of the jigs into the holes.

G. In the liquid container described in any one of A. to F. described above, the respective fitting claws may have an L-shape when viewed in a first direction, which is a relative movement direction in a process of fitting of the lid member and the case body, and the fitting claws and the fitted portions may be engaged in two different directions that intersect with the first direction.

According to this configuration, since the fitting claws and the fitted portions are engaged in two different directions that intersect with the first direction, the liquid container can be manufactured into a state in which it is difficult to disassemble the case. In addition, even such a case can be relatively easily disassembled into the case body and the lid member through inserting of the jigs into the holes.

H. The disassembling method is a disassembling method of a liquid container, the liquid container including a case, storing a liquid pack, that is formed through fitting of a case body having a bottomed cylindrical shape with an opening at one end, and a lid member that covers the opening of the case body, in a state in which the case body and the lid member are engaged, a plurality of fitting claws that is provided in one of the lid member and the case body, and a plurality of fitted portions that is provided in another one of the lid member and the case body and configured to be engaged with the plurality of fitting claws, in which a plurality of engagement portions in which the fitting claws and the fitted portions are engaged is located while being hidden inside the case, and the lid member has a plurality of holes at positions corresponding to the plurality of engagement portions, respectively, the disassembling method including inserting jigs into the plurality of holes and pressing and widening facing inner wall surfaces in the case toward an outside by the jigs to release or weaken engagement of the fitting claws and the fitted portions, and in a state in which engagement of the fitting claws and the fitted portions is released or weakened, separating the lid member and the case body.

According to this method, through pressing and widening of the facing inner wall surfaces in the case toward the outside by the jigs inserted into the plurality of holes, the engagement of the fitting claws and the fitted portions can be released or weakened. As a result, the case can be easily disassembled into the case body and the lid member.

I. In the disassembling method of the liquid container described in H. described above, the method may further include pressing and widening the facing inner wall surfaces in the case toward an outside by the jigs inserted into all of the plurality of holes to simultaneously release or weaken engagement of all of a plurality of engagement portions of the plurality of fitting claws and the plurality of fitted portions.

According to this method, through pressing and widening of the facing inner wall surfaces in the case toward the outside by the jigs inserted into all of the plurality of holes, engagement of all of the plurality of engagement portions of the plurality of fitting claws and the plurality of fitted portions can be simultaneously released or weakened. As a result, the case can be easily disassembled into the case body and the lid member.

What is claimed is:

1. A liquid container comprising:

a case, storing a liquid pack for containing a liquid, that includes
  a case body having a bottomed cylindrical shape with an opening at one end, and
  a lid member that covers the opening of the case body, and
is formed through fitting of the case body and the lid member in a state in which the lid member closes the opening;
a plurality of fitting claws that is provided in one of the lid member and the case body; and
a plurality of fitted portions that is provided in another one of the lid member and the case body and configured to be engaged with the plurality of fitting claws, wherein
  a plurality of engagement positions in which the plurality of fitting claws and the plurality of fitted portions are engaged, respectively, is located inside the case,
  the lid member has a plurality of boles at positions corresponding to the plurality of engagement positions respectively, in order to view the plurality of engagement positions,
  the bottomed cylindrical shape of the case body is a bottomed rectangular cylindrical shape with the opening at one end,
  the lid member has a lid plate portion having a rectangular plate shape and facing the opening, and
  the plurality of holes includes four holes provided at four corners of the lid plate portion.

2. A liquid container comprising:

a case, storing a liquid pack for containing a liquid, that includes
  a case body having a bottomed cylindrical shape with an opening at one end, and
  a lid member that covers the opening of the case body, and
is formed through fitting of the case body and the lid member in a state in which the lid member closes the opening;
a plurality of fitting claws that is provided in one of the lid member and the case body; and
a plurality of fitted portions that is provided in another one of the lid member and the case body and configured to be engaged with the plurality of fitting claws, wherein
  a plurality of engagement positions in which the plurality of fitting claws and the plurality of fitted portions are engaged, respectively, is located inside the case,
  the lid member has a plurality of holes at positions corresponding to the plurality of engagement positions respectively, in order to view the plurality of engagement positions,
  the respective fitting claws have a guide surface that guides the respective fitted portions in a direction intersecting with a first direction, which is a relative movement direction in a process of fitting of the lid member and the case body, and
  the respective fitted portions are engaged with the respective fitting claws at a position where the respective fitted portions are not guided any further after being guided by the guide surface.

3. A liquid container comprising:

a case, storing a liquid pack for containing a liquid, that includes
  a case body having a bottomed cylindrical shape with an opening at one end, and
  a lid member that covers the opening of the case body, and
is formed through fitting of the case body and the lid member in a state in which the lid member closes the opening;
a plurality of fitting claws that is provided in one of the lid member and the case body; and
a plurality of fitted portions that is provided in another one of the lid member and the case body and configured to be engaged with the plurality of fitting claws, wherein
  a plurality of engagement positions in which the plurality of fitting claws and the plurality of fitted portions are engaged, respectively, is located inside the case,
  the lid member has a plurality of boles at positions corresponding to the plurality of engagement positions respectively, in order to view the plurality of engagement positions,
  the respective fitting claws have an L-shape when viewed in a first direction, which is a relative movement direction in a process of fitting of the lid member and the case body, and
  the fitting claws and the fitted portions are engaged in two different directions that intersect with the first direction.

* * * * *